(12) United States Patent
Furuya et al.

(10) Patent No.: US 11,880,085 B2
(45) Date of Patent: Jan. 23, 2024

(54) RESIN COMPONENT HOLDING MEMBER, IMAGE DISPLAY DEVICE, AND LIGHT DIFFUSION MEMBER

(71) Applicant: Panasonic Intellectual Property Management Co., Ltd., Osaka (JP)

(72) Inventors: Hiroyuki Furuya, Osaka (JP); Susumu Uragami, Osaka (JP); Akira Kurozuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 581 days.

(21) Appl. No.: 17/061,531

(22) Filed: Oct. 1, 2020

(65) Prior Publication Data

US 2021/0018712 A1    Jan. 21, 2021

Related U.S. Application Data

(63) Continuation of application No. PCT/JP2019/011175, filed on Mar. 18, 2019.

(30) Foreign Application Priority Data

May 23, 2018    (JP) .................................. 2018-098838

(51) Int. Cl.
 *G02B 7/00*    (2021.01)
 *G02B 3/00*    (2006.01)
 *G02B 5/02*    (2006.01)
 *G02B 27/01*   (2006.01)

(52) U.S. Cl.
 CPC ............. *G02B 7/00* (2013.01); *G02B 3/0075* (2013.01); *G02B 5/0278* (2013.01); *G02B 27/0101* (2013.01)

(58) Field of Classification Search
 CPC ...... G02B 7/00; G02B 3/0075; G02B 5/0278; G02B 27/0101; G02B 26/101; G02B 27/0149; G03B 21/62
 See application file for complete search history.

(56) References Cited

U.S. PATENT DOCUMENTS 6,348,993 B1    2/2002  Hori
2002/0071190 A1    6/2002  Wada et al.
2019/0389174 A1*   12/2019  Sasaki ..................... B32B 27/20

FOREIGN PATENT DOCUMENTS

JP    H11-271883 A    10/1999
JP    2002-196208 A    7/2002
JP    2008-197282 A    8/2008

(Continued)

OTHER PUBLICATIONS

International Search Report issued in corresponding International Patent Application No. PCT/JP2019/011175, dated Jun. 18, 2018, with English translation.

(Continued)

*Primary Examiner* — Euncha P Cherry
(74) *Attorney, Agent, or Firm* — Rimon P.C.

(57) ABSTRACT

A resin component holding member is made of a metal material and holds a predetermined resin component. The resin component holding member includes, in at least a region with which the resin component can be in contact, a configuration for preventing alkaline residue caused by chemical treatment from permeating into the resin component.

14 Claims, 14 Drawing Sheets

(56) References Cited

FOREIGN PATENT DOCUMENTS

| | | | |
|---|---|---|---|
| JP | 2008-231561 | A | 10/2008 |
| JP | 2012-203244 | A | 10/2012 |
| JP | 2017-203898 | A | 11/2017 |
| WO | 2008/096822 | A1 | 8/2008 |
| WO | 2012/132649 | A1 | 10/2012 |

OTHER PUBLICATIONS

Japanese Office Action issued in corresponding Japanese Patent Application No. 2020-521055 dated Dec. 27, 2022, with English translation.

* cited by examiner

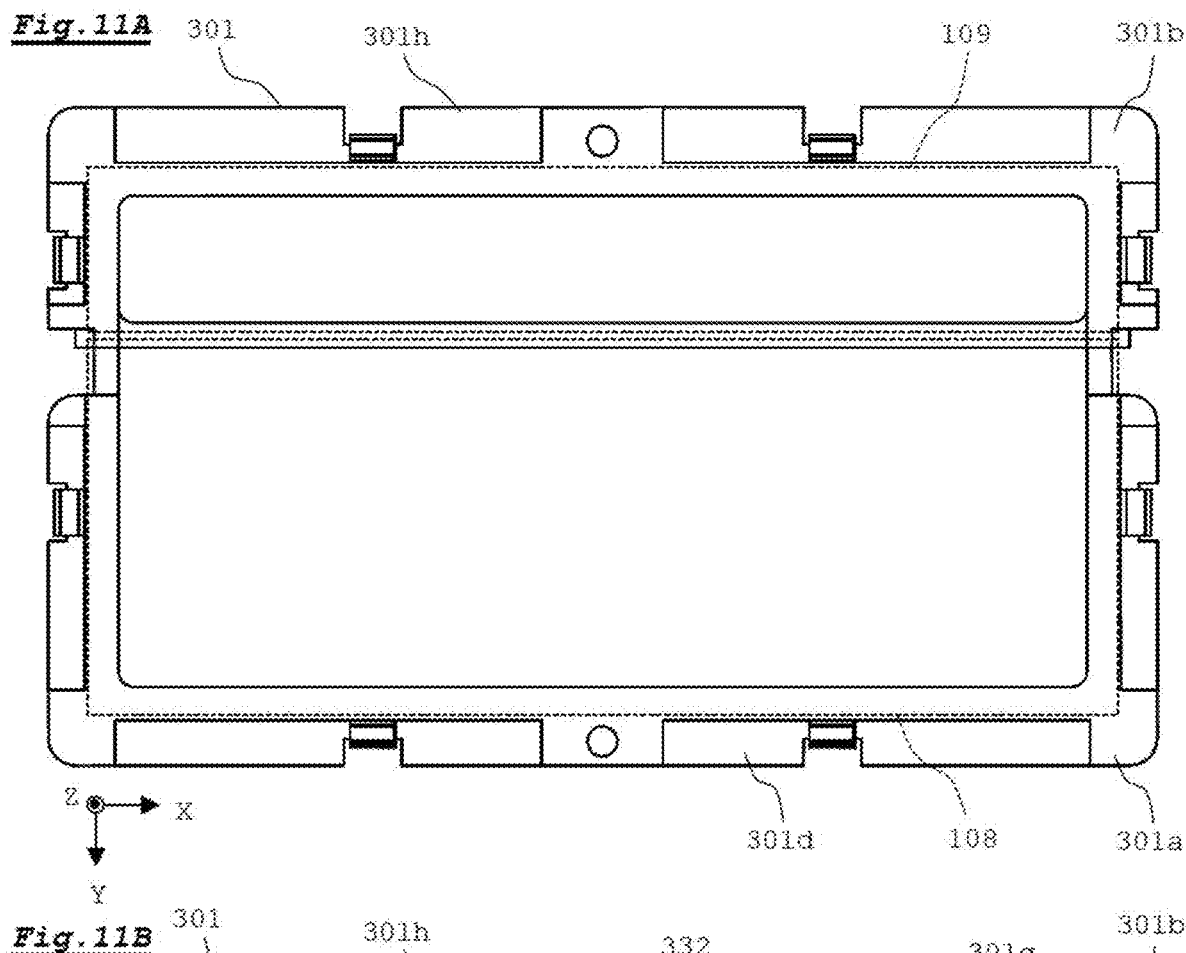
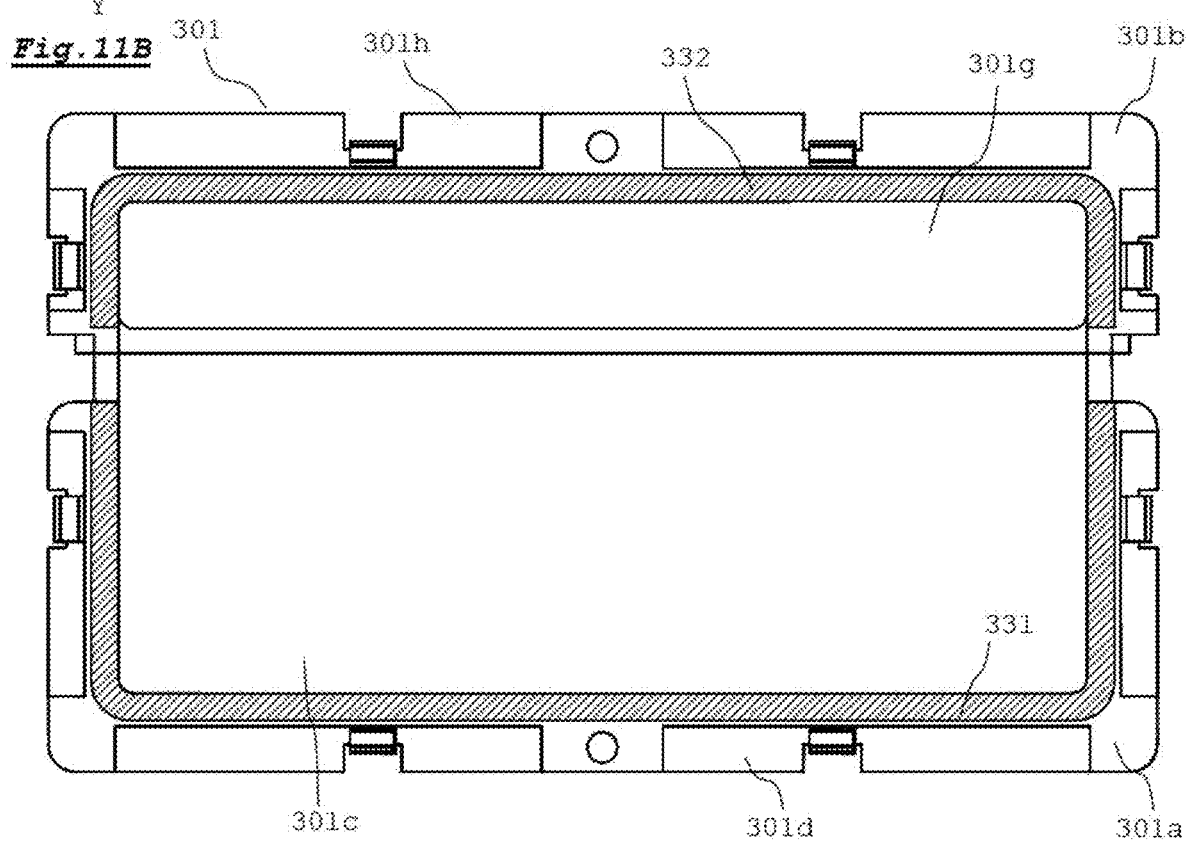

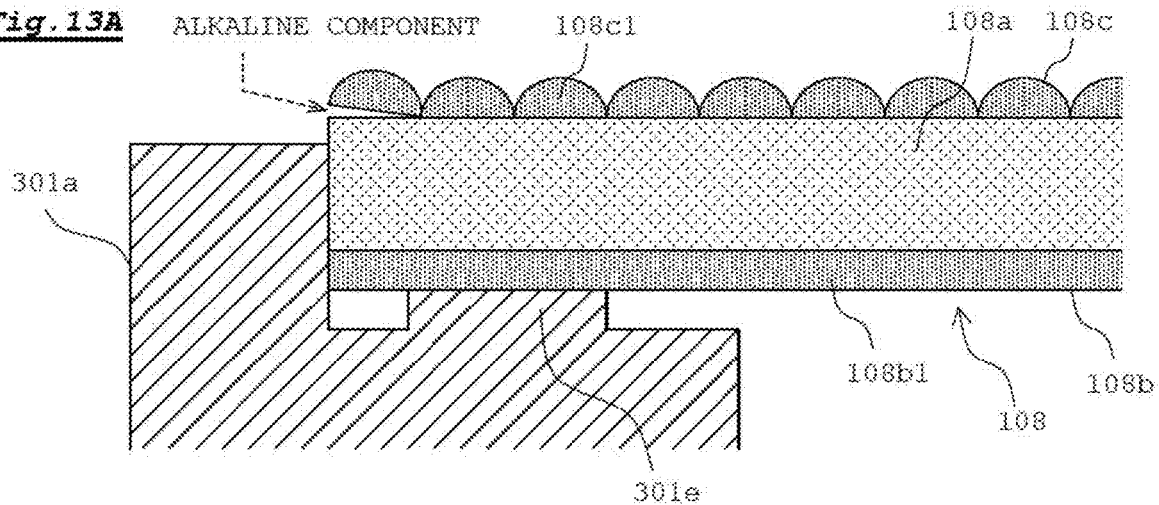
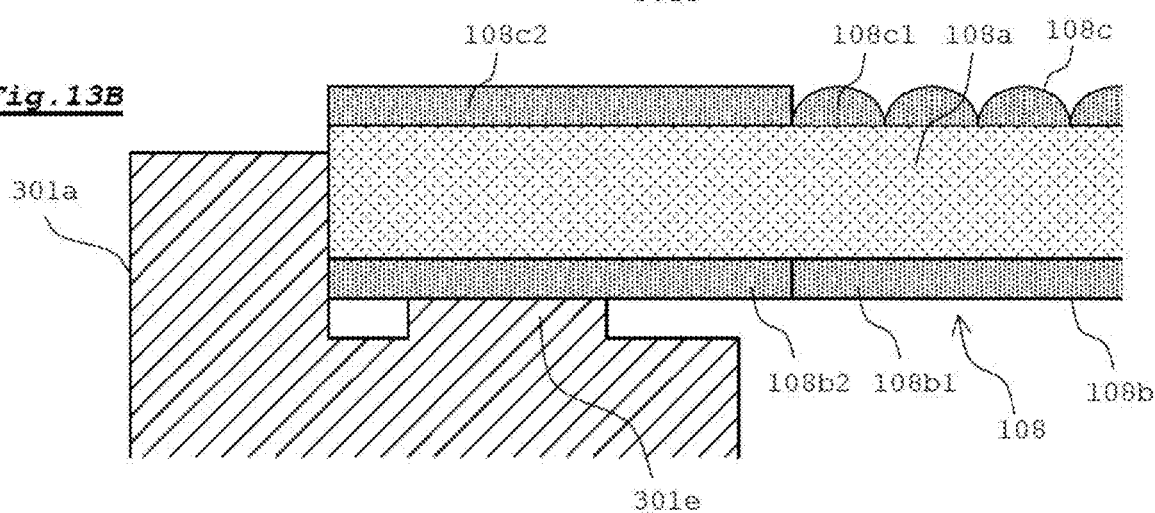
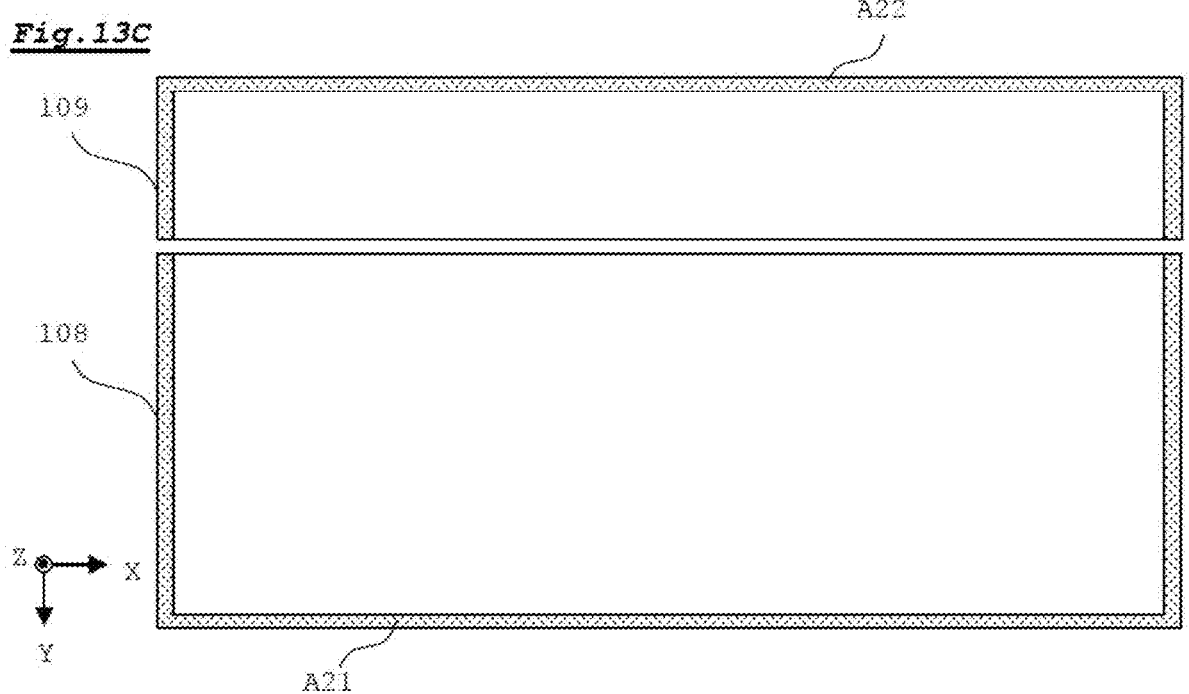

RESIN COMPONENT HOLDING MEMBER, IMAGE DISPLAY DEVICE, AND LIGHT DIFFUSION MEMBER

CROSS REFERENCE TO RELATED APPLICATION

This application is a continuation of International Application No. PCT/JP2019/011175 filed on Mar. 18, 2019, entitled "RESIN COMPONENT HOLDING MEMBER, IMAGE DISPLAY DEVICE, AND LIGHT DIFFUSION MEMBER", which claims priority under 35 U.S.C. Section 119 of Japanese Patent Application No. 2018-098838 filed on May 23, 2018, entitled "RESIN COMPONENT HOLDING MEMBER, IMAGE DISPLAY DEVICE, AND LIGHT DIFFUSION MEMBER". The disclosure of the above applications is incorporated herein by reference.

BACKGROUND OF THE INVENTION

1. Field of the Invention

The present invention relates to a resin component holding member that holds a component made of a resin material, an image display device in which the resin component holding member is used, and a light diffusion member installed in the image display device.

2. Disclosure of Related Art

In recent years, an image display device referred to as a head-up display has been developed. In a head-up display mounted on a passenger car, light modulated by image information is projected toward a windshield, and the reflected light is applied to the eyes of a driver. Accordingly, the driver is allowed to see a virtual image as an image in front of the windshield.

In this type of image display device, scanning is performed on a screen with laser light emitted from a light source, while the laser light is modulated in accordance with an image signal. The laser light is diffused by the screen, which is a light diffusion member, and is guided to an eye box around the eyes of the driver. Accordingly, the driver is allowed to favorably and stably see an image (virtual image) even when the driver slightly moves their head. The screen is, for example, formed from a resin material, is held by a predetermined holding member, and is installed in the device.

In this configuration, the screen can be exposed to a high temperature and high humidity environment such as the inside of the car. Therefore, the screen needs to be installed in the device so as to operate properly even in a high temperature and high humidity environment.

Japanese Laid-Open Patent Publication No. H11-271883 discloses a transmission type screen that includes a plurality of screens configured to expand and contract depending on changes in temperature and humidity and onto which image light emitted from an image generation source is projected. The transmission type screen includes a first screen and a second screen having relatively lower rigidity than the first screen. Japanese Laid-Open Patent Publication No. H11-271883 states that the second screen that has expanded by being left in a high temperature or high humidity environment is fixed to the first screen, whereby wrinkling or separation does not occur on the relatively low-rigidity second screen and a transmission type screen that causes less deterioration of an image is obtained.

In the image display device described above, external light such as sunlight may travel backwards through an optical system toward the screen. Thus, a holding member that holds the screen is usually made of a metal material as a measure against heating due to condensing of external light. Furthermore, the holding member is subjected to black coating or treatment of surface processing such as matting in order to prevent stray light from being mixed in light for generating a virtual image. In Japanese Laid-Open Patent Publication No. H11-271883, the influence of such treatment of surface processing on the characteristics of the screen is not studied at all.

SUMMARY OF THE INVENTION

A first aspect of the present invention is directed to a resin component holding member made of a metal material and configured to hold a predetermined resin component. The resin component holding member according to the aspect includes a configuration for preventing alkaline residue caused by chemical treatment from permeating into the resin component, in at least a region with which the resin component can be in contact.

In the resin component holding member according to the aspect, the alkaline residue can be prevented from permeating into the resin component installed on the resin component holding member, from the resin component holding member. Thus, even in the case where treatment of coating or surface processing such as matting is performed on the resin component holding member, deterioration of the resin component due to the alkaline residue can be inhibited. Therefore, good characteristics of the resin component which is a member to be held can be ensured.

The resin component holding member according to the aspect is not necessarily limited to a member for holding a screen (light diffusion member), and may be a member for holding another resin component such as a lens. In addition, the resin component holding member according to the aspect does not necessarily have to be a member used in an image display device, and may be used in other devices such as a laser radar.

A second aspect of the present invention is directed to an image display device. The image display device according to the aspect includes the resin component holding member according to the first aspect, and the resin component held by the resin component holding member.

In the resin component holding member according to the aspect, the same advantageous effects as those in the first aspect can be achieved. In addition, since deterioration of the resin component can be inhibited, the quality and performance of the image display device can be maintained high.

A third aspect of the present invention is directed to a light diffusion member to be held by a resin component holding member made of a metal material, and installed in an image display device. The light diffusion member according to the aspect includes: a substrate made of a resin; a plurality of lens portions formed on at least one surface of the substrate; and a flat portion formed on at least a region, near an edge held by the resin component holding member, of the surface on which the lens portions are formed.

In the light diffusion member according to the aspect, since the flat portion is formed on at least the region near the edge held by the resin component holding member, peeling, near the edge of the light diffusion member, from the substrate due to stress generated when the light diffusion member is cut out from a mother substrate is inhibited. Thus, the alkaline residue in the resin component holding member can be inhibited from permeating into the substrate made of the resin from the peeled portion near the edge, and deterioration of the substrate can be more effectively prevented.

BRIEF DESCRIPTION OF THE DRAWINGS

The above and other objects and new features of the present invention will be fully clarified by the following description of the embodiment, when read in conjunction with accompanying drawings.

FIG. 11A is a plan view of a holder according to Modification 1;

FIG. 11B is a plan view of the holder, according to Modification 1, in a state where spacers are installed on the holder;

FIG. 13A is a cross-sectional view schematically showing a state of peeling that may occur in the screen;

FIG. 13B is a cross-sectional view schematically showing a configuration of a screen according to Modification 3;

FIG. 13C is a plan view schematically showing a region where a flat portion is formed in each screen according to Modification 3.

It should be noted that the drawings are solely for description and do not limit the scope of the present invention by any degree.

DESCRIPTION OF THE PREFERRED EMBODIMENTS

Hereinafter, an embodiment of the present invention will be described with reference to the drawings. For convenience, in each drawing, X, Y, and Z axes that are orthogonal to each other are additionally shown.

Figure 1A:
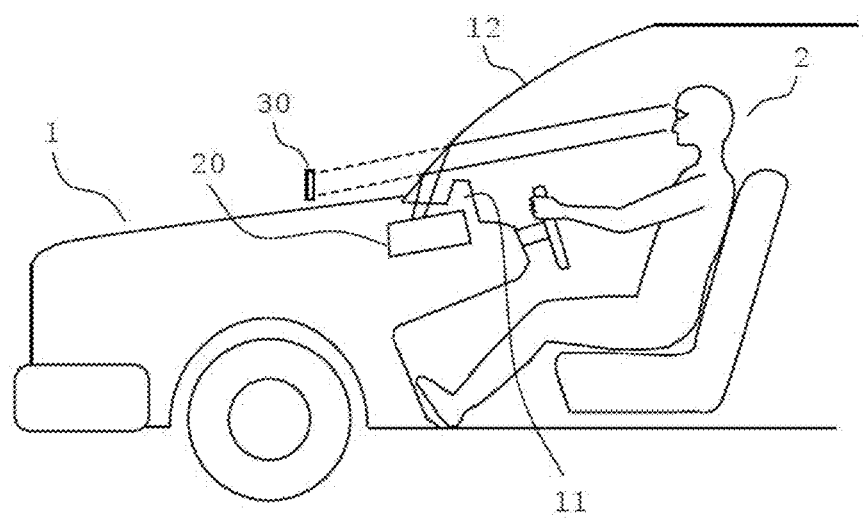
FIG. 1A and FIG. 1B are diagrams schematically showing a use form of an image display device according to an embodiment.
Figure 1B:
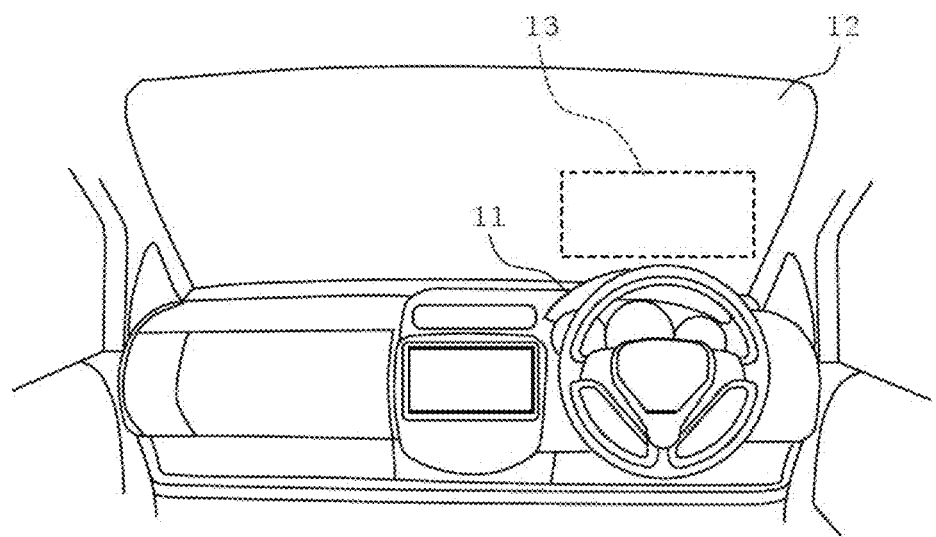

FIG. 1A and FIG. 1B are diagrams schematically showing a use form of an image display device 20. FIG. 1A is a schematic diagram in which the inside of a passenger car 1 is seen through from a lateral side of the passenger car 1, and FIG. 1B is a diagram when the front in a traveling direction is viewed from the inside of the passenger car 1.

In the present embodiment, the present invention is applied to a vehicle-mounted head-up display. As shown in FIG. 1A, the image display device 20 is installed within a dashboard 11 of the passenger car 1.

As shown in FIG. 1A and FIG. 1B, the image display device 20 projects light modulated by an image signal onto a projection region 13 that is on a lower side of a windshield 12 and near a driver's seat. The projected light is reflected by the projection region 13 and applied to a horizontally long region (eye box region) around the positions the eyes of a driver 2. Accordingly, a predetermined image 30 is displayed as a virtual image in the front field of view of the driver 2. The driver 2 is allowed to see the image 30, which is a virtual image, such that the image 30 is superimposed on a view in front of the windshield 12. That is, the image display device 20 forms the image 30, which is a virtual image, in a space in front of the projection region 13 of the windshield 12.

Figure 1C:
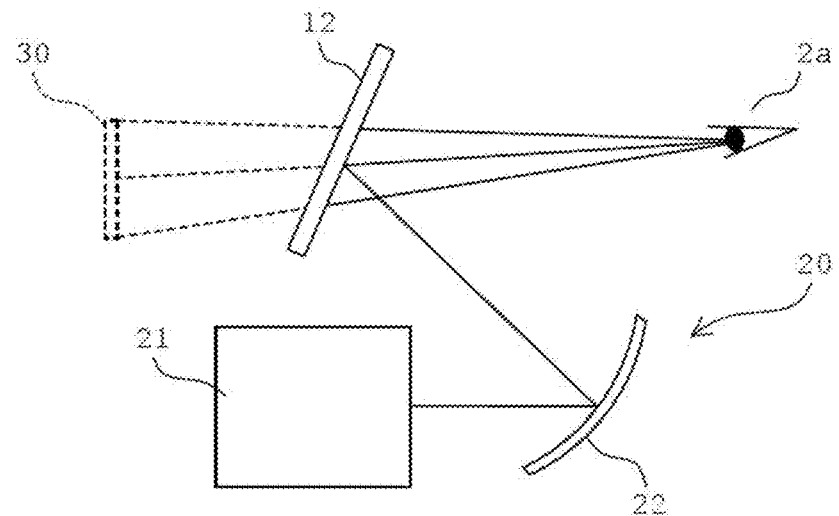
FIG. 1C is a diagram schematically showing a configuration of the image display device according to the embodiment.

FIG. 1C is a diagram schematically showing a configuration of the image display device 20.

The image display device 20 includes an irradiation light generation unit 21 and a mirror 22. The irradiation light generation unit 21 emits light modulated by an image signal. The mirror 22 has a curved reflecting surface and reflects the light emitted from the irradiation light generation unit 21, toward the windshield 12. The light reflected by the windshield 12 is applied to the eyes 2a of the driver 2. An optical system of the irradiation light generation unit 21 and the mirror 22 are designed such that the image 30, which is a virtual image, is displayed in front of the windshield 12 in a predetermined size.

The mirror 22 forms an optical system for generating a virtual image by light generated from screens 108 and 109 (light diffusion members) described later. The optical system does not necessarily have to be formed of only the mirror 22. For example, the optical system may include a plurality of mirrors, or may include a lens, etc.

Figure 2:
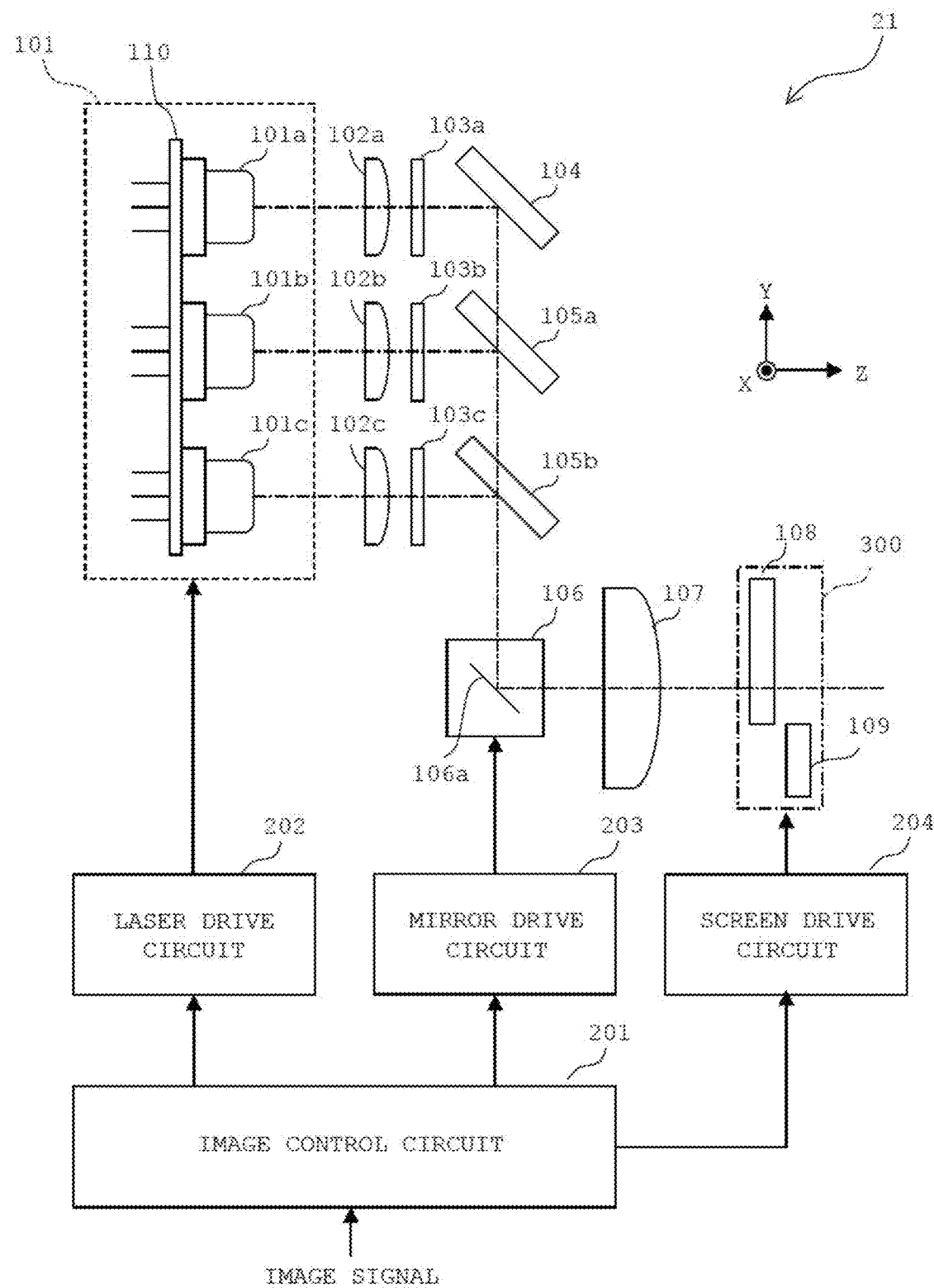
FIG. 2 is a diagram showing configurations of an irradiation light generation unit of the image display device according to the embodiment and a circuit used for the irradiation light generation unit.

FIG. 2 is a diagram showing a configuration of the irradiation light generation unit 21 of the image display device and a configuration of a circuit used for the irradiation light generation unit 21.

The irradiation light generation unit 21 includes a light source 101, collimator lenses 102a to 102c, apertures 103a to 103c, a mirror 104, dichroic mirrors 105a and 105b, a scanning part 106, a correction lens 107, and the screens 108 and 109.

The light source 101 includes three laser light sources 101a, 101b, and 101c. The laser light sources 101a, 101b, and 101c are installed on one circuit board 110.

The laser light source 101a emits laser light having a red wavelength included in the range of 635 nm or more and 645 nm or less, the laser light source 101b emits laser light having a green wavelength included in the range of 510 nm or more and 530 nm or less, and the laser light source 101c emits laser light having a blue wavelength included in the range of 440 nm or more and 460 nm or less.

In the present embodiment, in order to display a color image as the image 30, the light source 101 includes these three laser light sources 101a, 101b, and 101c. The laser light sources 101a, 101b, and 101c are each composed of, for example, a semiconductor laser. In the case of displaying a single-color image as the image 30, the light source 101 may include only one laser light source corresponding to the color of the image. In addition, the light source 101 may include two laser light sources having different emission wavelengths.

The laser light emitted from the laser light sources 101a, 101b, and 101c is converted to parallel light by the collimator lenses 102a to 102c, respectively. The laser light that has passed through the collimator lenses 102a to 102c is shaped into circular beams having substantially the same size, by the apertures 103a to 103c, respectively.

Thereafter, the optical axes of the laser light of the respective colors emitted from the laser light sources 101a, 101b, and 101c are caused to coincide with each other by the mirror 104 and the two dichroic mirrors 105a and 105b. The mirror 104 substantially totally reflects the red laser light that has passed through the collimator lens 102a. The dichroic mirror 105a reflects the green laser light that has passed through the collimator lens 102b, and transmits the red laser light reflected by the mirror 104. The dichroic mirror 105b reflects the blue laser light that has passed through the collimator lens 102c, and transmits the red laser light and the green laser light that have passed through the dichroic mirror 105a. The mirror 104 and the two dichroic mirrors 105a and 105b are disposed such that the optical axes of the laser light of the respective colors emitted from the laser light sources 101a, 101b, and 101c are caused to coincide with each other.

The scanning part 106 reflects the laser light of the respective colors that has passed through the dichroic mirror 105b. The scanning part 106 is composed of, for example, a MEMS (micro electro mechanical system) mirror, and rotates a mirror 106a, on which the laser light of the respective colors that has passed through the dichroic mirror 105b is incident, about an axis parallel to the X axis and an axis perpendicular to the X axis and parallel to a reflecting surface of the mirror 106a in accordance with a drive signal. By rotating the mirror 106a as described above, the reflection direction of the laser light is changed in a direction parallel to the XZ plane and a direction parallel to the YZ plane. Accordingly, scanning is performed two-dimensionally on the screens 108 and 109 with the laser light of the respective colors.

The correction lens 107 is designed so as to direct the laser light of the respective colors in the Z-axis positive direction regardless of the swing angle of the laser light by the scanning part 106. The correction lens 107 is configured, for example, by combining a plurality of lenses.

The screens 108 and 109 are light diffusion members that diffuse light. An image is formed by performing scanning on the screens 108 and 109 with the laser light, and the screens 108 and 109 have a function to diffuse the incident laser light to the region (eye box region) around the positions of the eyes 2a of the driver 2. The screens 108 and 109 can each be composed of a microlens array, a diffusion plate, or the like. The screens 108 and 109 can each be made of a transparent resin such as polycarbonate or PET (polyethylene terephthalate).

The screens 108 and 109 are driven in the Z-axis direction by a drive unit 300. The screen 108 is for displaying an image having a parallax in the depth direction, and the screen 109 is for displaying an image having no parallax in the depth direction. The screens 108 and 109 are disposed so as to be separated from each other with a predetermined step in the Z-axis direction in a state where the boundaries thereof substantially overlap each other in the Y direction. The screens 108 and 109 are integrally driven in the Z-axis direction by the drive unit 300. The drive unit 300 includes, for example, a coil and a magnetic circuit, and drives a holder that holds the screens 108 and 109, by electromagnetic force generated in the coil. The configuration of the drive unit 300 will be described later with reference to FIG. 4A to FIG. 6B.

An image having a parallax in the depth direction is displayed in front of the windshield 12 by an image being drawn on the screen 108 by the laser light of the respective colors while moving the screens 108 and 109. In addition, an image having no parallax is displayed in front of the windshield 12 by an image being drawn on the screen 109 by the laser light of the respective colors in a state where the screens 108 and 109 are caused to be stationary at predetermined positions in the Z-axis direction.

An image control circuit 201 includes an arithmetic processing unit such as a CPU (central processing unit), and a memory, and processes an inputted image signal to control a laser drive circuit 202, a mirror drive circuit 203, and a screen drive circuit 204.

The laser drive circuit 202 changes the emission intensity of the laser light sources 101a, 101b, and 101c in accordance with a control signal inputted from the image control circuit 201. The mirror drive circuit 203 drives the mirror 106a of the scanning part 106 in accordance with a control signal from the image control circuit 201. The screen drive circuit 204 drives the drive unit 300 in accordance with a control signal from the image control circuit 201.

Figure 3A:
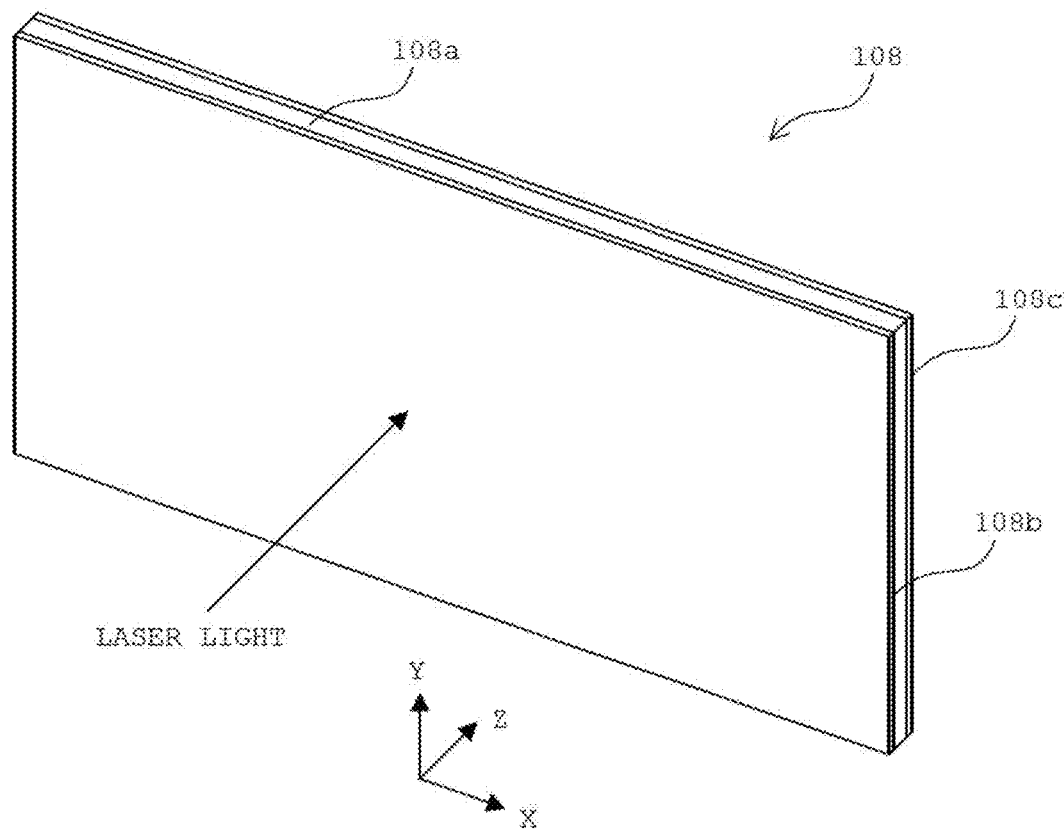
FIG. 3A is a perspective view schematically showing a configuration of a screen according to the embodiment.

FIG. 3A is a perspective view schematically showing a configuration of the screen 108.

The screen 108 has a configuration in which lens layers 108b and 108c are formed on an incident surface and an emission surface of a substrate 108a, respectively. A plurality of lens portions that diffuse laser light in the X-axis direction are formed in the lens layer 108b so as to be aligned in the X-axis direction. In addition, a plurality of lens portions that diffuse laser light in the Y-axis direction are formed in the lens layer 108c so as to be aligned in the Y-axis direction.

Each lens portion formed in the lens layer 108b has an arc shape when being viewed in the Y-axis direction. In addition, each lens portion formed in the lens layer 108c has an arc shape when being viewed in the X-axis direction. The width (pitch) of each lens portion is about several tens of micrometers. The curvature of each lens portion is set such that the laser light that passes through the screen 108 is guided to the horizontally long region (eye box region) around the positions of the eyes 2a of the driver 2.

The substrate 108a is made of a transparent resin material such as polycarbonate or PET. The lens layers 108b and 108c are formed on the incident surface and the emission surface of the substrate 108a, respectively, by embossing using an ultraviolet curable resin.

The screen 109 also has the same configuration as the screen 108. It should be noted that the screen 109 has a shorter width in the Y-axis direction than the screen 108. As will be described later, the screens 108 and 109 are held by a holder 301 made of a metal.

Figure 3B:
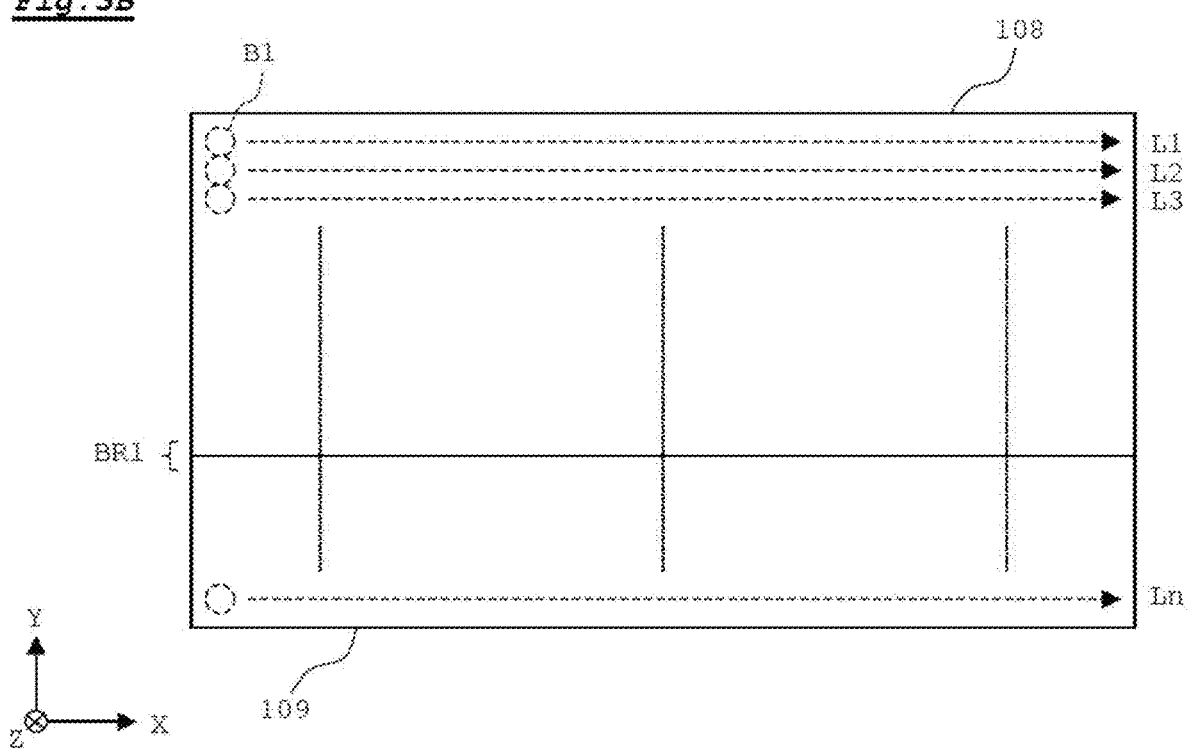
FIG. 3B is a diagram schematically showing a relationship between the screens according to the embodiment and scanning lines.

FIG. 3B is a diagram schematically showing a relationship between the screens 108 and 109 and scanning lines.

Scanning is performed on the incident surfaces (surfaces on the Z-axis negative side) of the screens 108 and 109 having the above configuration, with a beam B1 obtained by combining the laser light of the respective colors. Scanning lines L1 to Ln on which the beam B1 passes are set in advance on the incident surfaces of the screens 108 and 109 at regular intervals in the Y-axis direction. The scanning lines L1 to Ln are set across a boundary BR1 between the screens 108 and 109. A one-frame image is drawn by the scanning lines L1 to Ln.

Scanning is performed sequentially on the scanning lines L1 to Ln, which are set as described above, from the Y-axis positive side with the beam B1. At each of pixel positions on the scanning lines L1 to Ln, laser light of the respective colors is emitted from the laser light sources 101a to 101c in a pulsed manner with a predetermined pulse width.

A one-frame image is drawn on the screens 108 and 109 by performing two-dimensional scanning on the screens 108 and 109 with the beam B1 as described above. The scanning cycle from the scanning line L1 to the scanning line Ln is, for example, 1/60 second. As described above, an image for displaying an image having a parallax in the depth direction is drawn on the screen 108, and an image for displaying an image having no parallax in the depth direction is drawn on the screen 109.

Figure 4A:
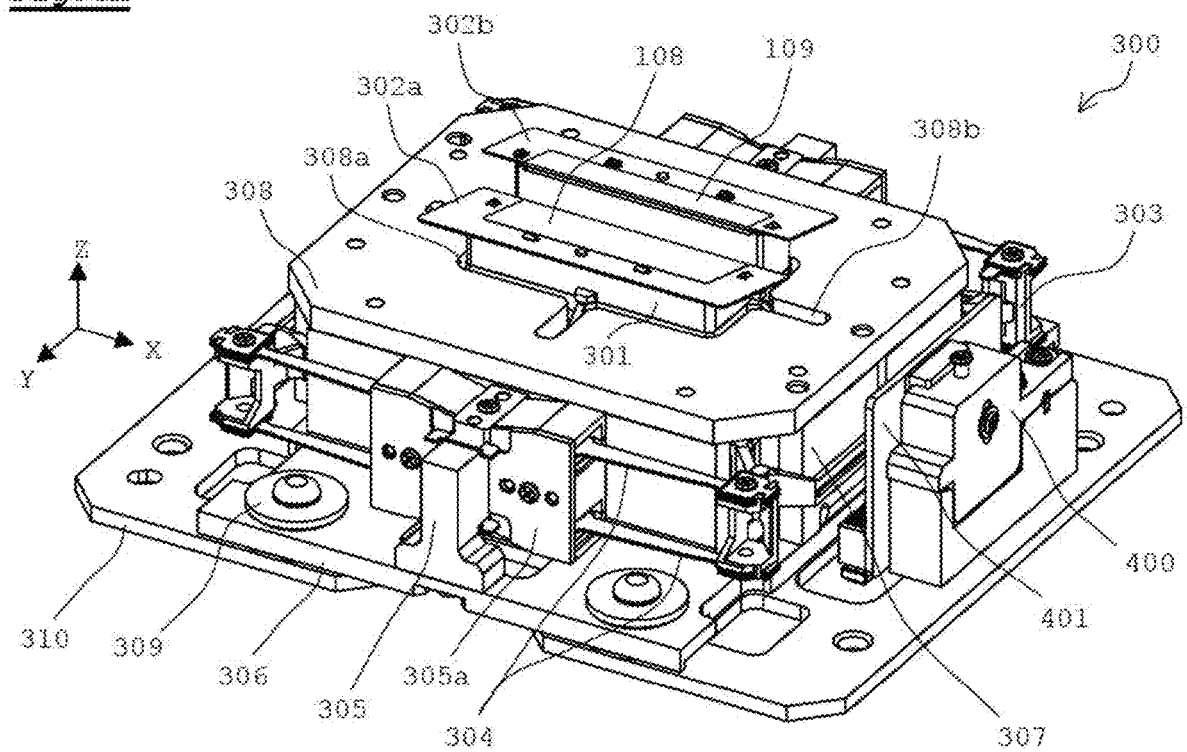
FIG. 4A and FIG. 4B are perspective views showing a configuration of a drive unit, according to the embodiment, which drives the screen.
Figure 4B:
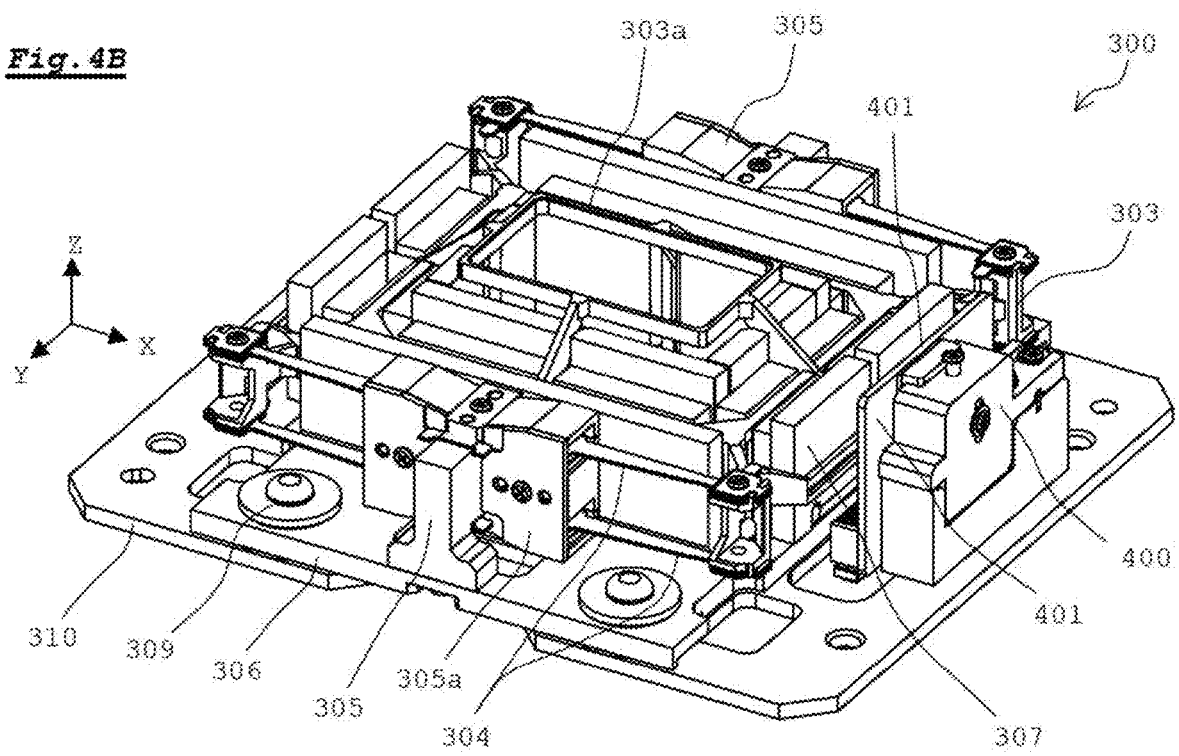

FIG. 4A is a perspective view showing a configuration of the drive unit 300, and FIG. 4B is a perspective view showing a configuration of the drive unit 300 in a state where a magnetic cover 308 and the holder 301 are removed from the drive unit 300.

FIG. 4A and FIG. 4B show a state where the drive unit 300 is supported by a support base 306 and a fixed base 310. The support base 306 and the fixed base 310 are provided with openings for allowing the laser light of the respective colors to pass therethrough in the Z-axis direction. The laser light of the respective colors is applied from the Z-axis negative side through the openings to the screens 108 and 109.

As shown in FIG. 4A, the screens 108 and 109 are integrally supported by the holder 301 such that the screens 108 and 109 are tilted in the same direction. The two screens 108 and 109 are aligned in a direction (Y-axis direction) perpendicular to the travelling direction of the laser light (Z-axis direction) and provided at positions displaced relative to each other with a predetermined step in the travelling direction of the laser light (Z-axis direction). Light blocking members 302a and 302b are provided on the upper surface of the holder 301. The light blocking members 302a and 302b are for preventing external light travelling backwards through the optical system in FIG. 1C from entering the inside of the drive unit 300.

The holder 301 on which the screens 108 and 109 are installed is installed on an inner frame portion 303a of a support member 303 shown in FIG. 4B. The support member 303 is supported by two support units 305, which are aligned in the Y-axis direction, via four suspensions 304 so as to be movable in the Z-axis direction. The support units 305 are installed on the support base 306. The support units 305 each include gel covers 305a on the X-axis positive side and the X-axis negative side, respectively, and these gel covers 305a are filled with gel for damping.

Thus, the screens 108 and 109 are supported by the support base 306 via the holder 301, the support member 303, the suspensions 304, and the support units 305 so as to be movable in the Z-axis direction.

A magnetic circuit 307 is further installed on the support base 306. The magnetic circuit 307 is for applying a magnetic field to a coil 311 (see FIG. 5A) mounted on the support member 303. By applying a drive signal (current) to the coil 311, electromagnetic force in the Z-axis direction is generated in the coil 311. Accordingly, the support member 303 is driven in the Z-axis direction together with the coil 311. Thus, the screens 108 and 109 move in the Z-axis direction.

The magnetic cover 308 is placed on the upper surface of the magnetic circuit 307. The magnetic cover 308 is made of a magnetic material and functions as a yoke for the magnetic circuit 307. When the magnetic cover 308 is placed on the upper surface of the magnetic circuit 307, the magnetic cover 308 is attracted to the magnetic circuit 307. Accordingly, the magnetic cover 308 is installed on the drive unit 300. As shown in FIG. 4A, the magnetic cover 308 is provided with an opening 308a for passing the holder 301 therethrough, and slits 308b for passing beam portions 303c (see FIG. 5A) of the support member 303 therethrough.

The support base 306 is installed on the fixed base 310 via damper units 309. The damper units 309 support the support base 306 in a state where the support base 306 is raised from the fixed base 310 in the Z-axis positive direction. The damper units 309 absorb vibration generated by driving the support member 303, before the vibration propagates from the support base 306 to the fixed base 310.

A position detection unit 400 is further installed on the fixed base 310. The position detection unit 400 includes a printed board 401 facing a side surface on the X-axis positive side of the support member 303. An encoder (not shown) is disposed on a surface on the X-axis negative side of the printed board 401. The position in the Z-axis direction of the support member 303 is detected by the encoder.

Figure 5A:
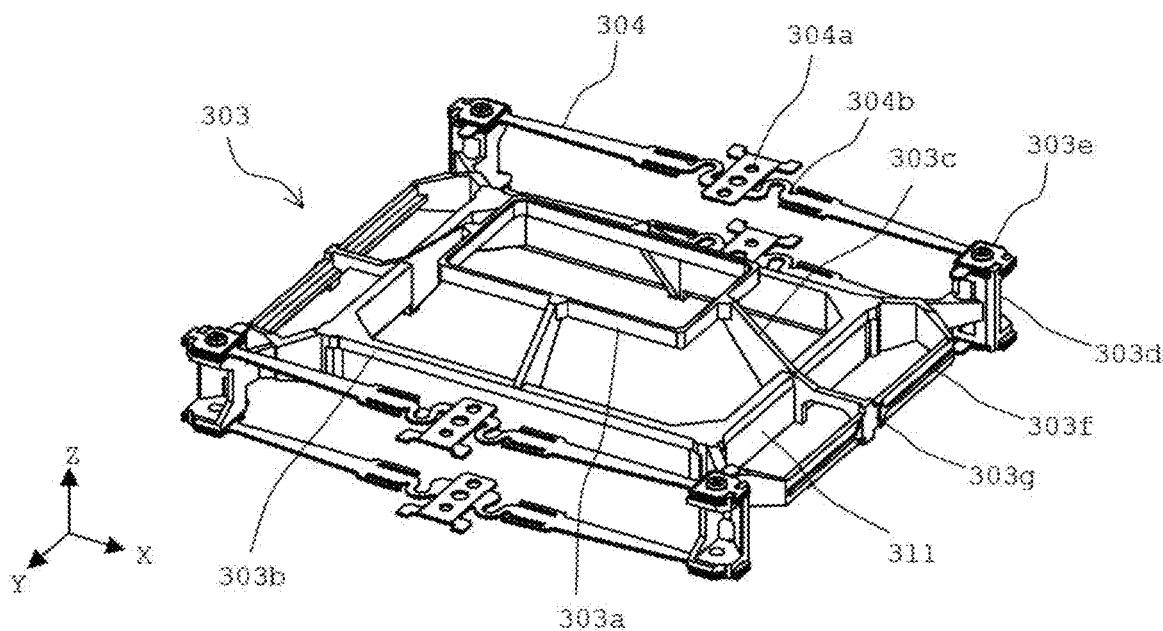
FIG. 5A is a perspective view showing a configuration in a state where a support member and suspensions according to the embodiment are assembled.

FIG. 5A is a perspective view showing a configuration in a state where the support member 303 and the suspensions 304 are assembled.

As shown in FIG. 5A, the support member 303 has a frame-like shape. The support member 303 is formed from a material that is lightweight and has high rigidity. The support member 303 includes the inner frame portion 303a and an outer frame portion 303b each of which has a substantially rectangular shape in a plan view. The inner frame portion 303a and the outer frame portion 303b are connected by the four beam portions 303c such that the center of the inner frame portion 303a and the center of the outer frame portion 303b coincide with each other in a plan view. The inner frame portion 303a is raised to a position shifted upward (in the Z-axis positive direction) with respect to the outer frame portion 303b.

The holder 301 is installed on the upper surface of the inner frame portion 303a. In addition, the coil 311 is mounted on the lower surface of the outer frame portion 303b. The coil 311 extend around along the lower surface of the outer frame portion 303b in a shape obtained by rounding the corners of a rectangle.

Connection portions 303*d* are formed at the corners of the outer frame portion 303*b* so as to extend radially. Each of these connection portions 303*d* has flange portions at an upper end and a lower end thereof, respectively. An end portion of the suspension 304 on the upper side is fixed to the upper surface of the upper flange portion of the connection portion 303*d* by a fixture 303*e*. In addition, an end portion of the suspension 304 on the lower side is fixed to the lower surface of the lower flange portion of the connection portion 303*d* by a fixture 303*e*. Thus, the suspensions 304 are mounted on the support member 303.

The support member 303 further includes bridge portions 303*f* that connect the connection portions 303*d* adjacent to each other in the Y-axis direction. A portion of each of the bridge portions 303*f* other than both ends in the Y-axis direction extend so as to be parallel to the Y-axis direction, and each bridge portion 303*f* has, at the center of this portion, an installation surface 303*g* parallel to the YZ plane. A scale is installed on the installation surface 303*g* of the bridge portion 303*f* on the X-axis positive side of the support member 303. The scale faces the encoder of the position detection unit 400 shown in FIG. 4A and FIG. 4B. Thus, the position in the Z-axis direction of the support member 303 is detected by the encoder.

Each suspension 304 has three holes 304*a* at the center position thereof in the X-axis direction. In addition, each suspension 304 has crank-shaped stretching/contracting structures 304*b* on both sides of the three holes 304*a*. The two suspensions 304 on the Y-axis positive side and the two suspensions 304 on the Y-axis negative side are each mounted on the support unit 305 via the three holes 304*a* as shown in FIG. 4A and FIG. 4B.

Figure 5B:
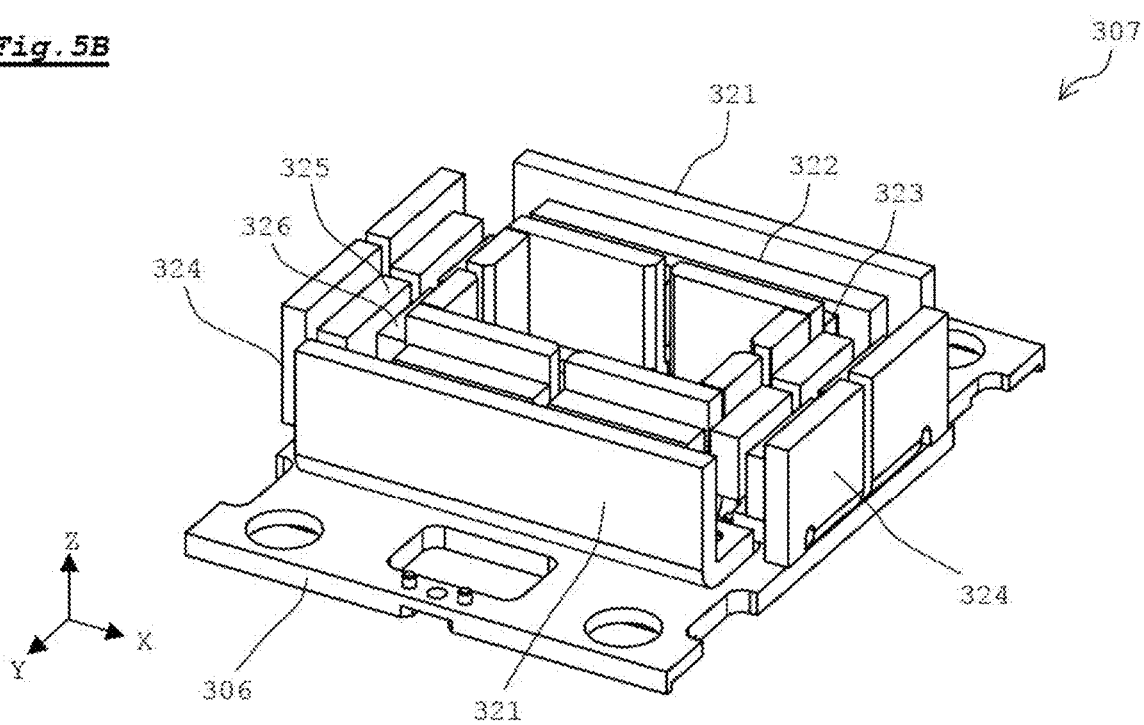
FIG. 5B is a perspective view showing a configuration of a magnetic circuit according to the embodiment.

FIG. 5B is a perspective view showing a configuration of the magnetic circuit 307. FIG. 5B shows a state where the magnetic circuit 307 is installed on the upper surface of the support base 306.

The magnetic circuit 307 includes two yokes 321 disposed so as to be aligned in the Y-axis direction. The shapes of the yokes 321 when viewed in the X-axis direction are U shapes. An inner wall portion 321*b* of each of the two yokes 321 is divided into two portions. A magnet 322 is disposed inward of an outer wall portion 321*a* of each yoke 321. In addition, magnets 323 are disposed outward of the two inner wall portions 321*b* of each yoke 321, respectively, so as to face the magnet 322. A gap into which the above-described coil 311 is inserted is formed between the magnet 322 and the magnets 323 facing each other.

The magnetic circuit 307 further includes two yokes 324 disposed so as to be aligned in the X-axis direction. The shapes of the yokes 324 when viewed in the Y-axis direction are U shapes. An outer wall portion 324*a* of each of the two yokes 324 is divided into two portions, and an inner wall portion 324*b* of each of the two yokes 324 is also divided into two portions. Magnets 325 are disposed inward of the two outer wall portions 324*a* of each yoke 324, respectively. In addition, magnets 326 are disposed outward of the two inner wall portions 324*b* of each yoke 324 so as to face the magnets 325, respectively. A gap into which the above-described coil 311 is inserted is formed between the magnets 325 and the magnets 326 facing each other. An end portion in the Y-axis direction of each magnet 326 overlaps a side surface of the inner wall portion 321*b* of the adjacent yoke 321.

Figure 6A:
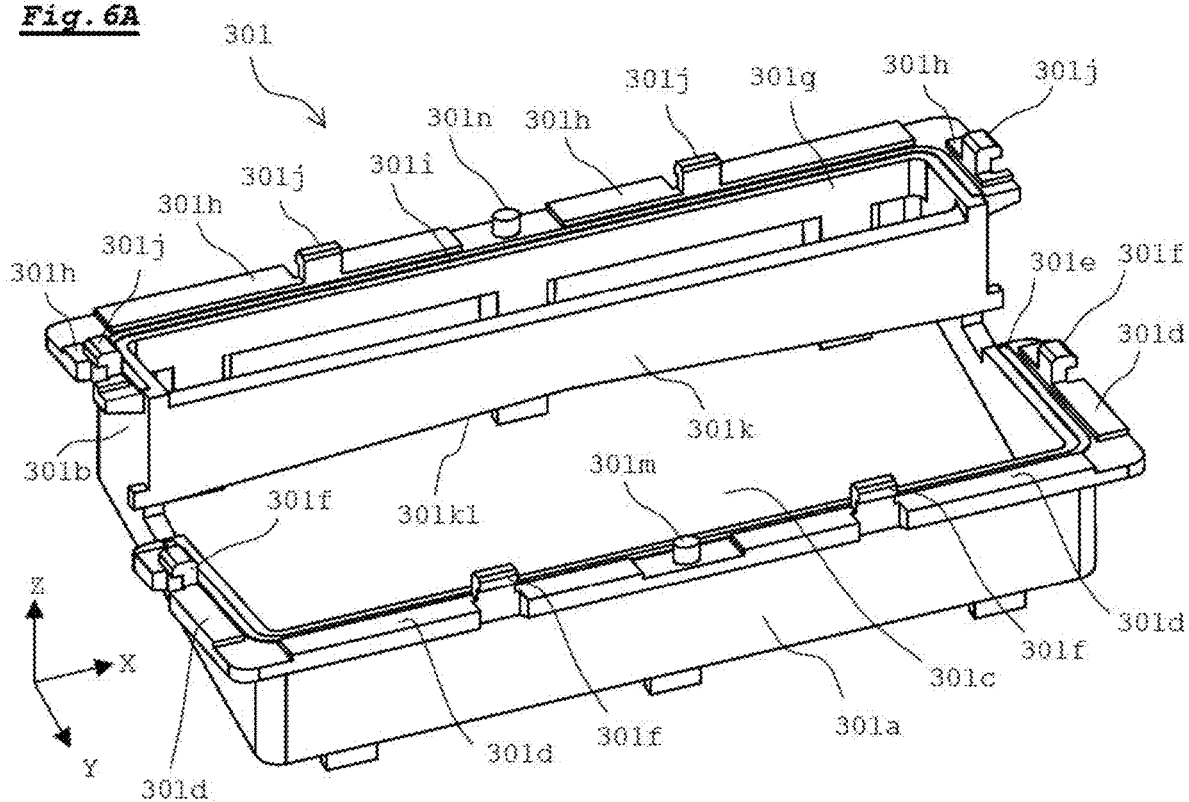
FIG. 6A and FIG. 6B are each a perspective view showing a configuration of a holder according to the embodiment.
Figure 6B:
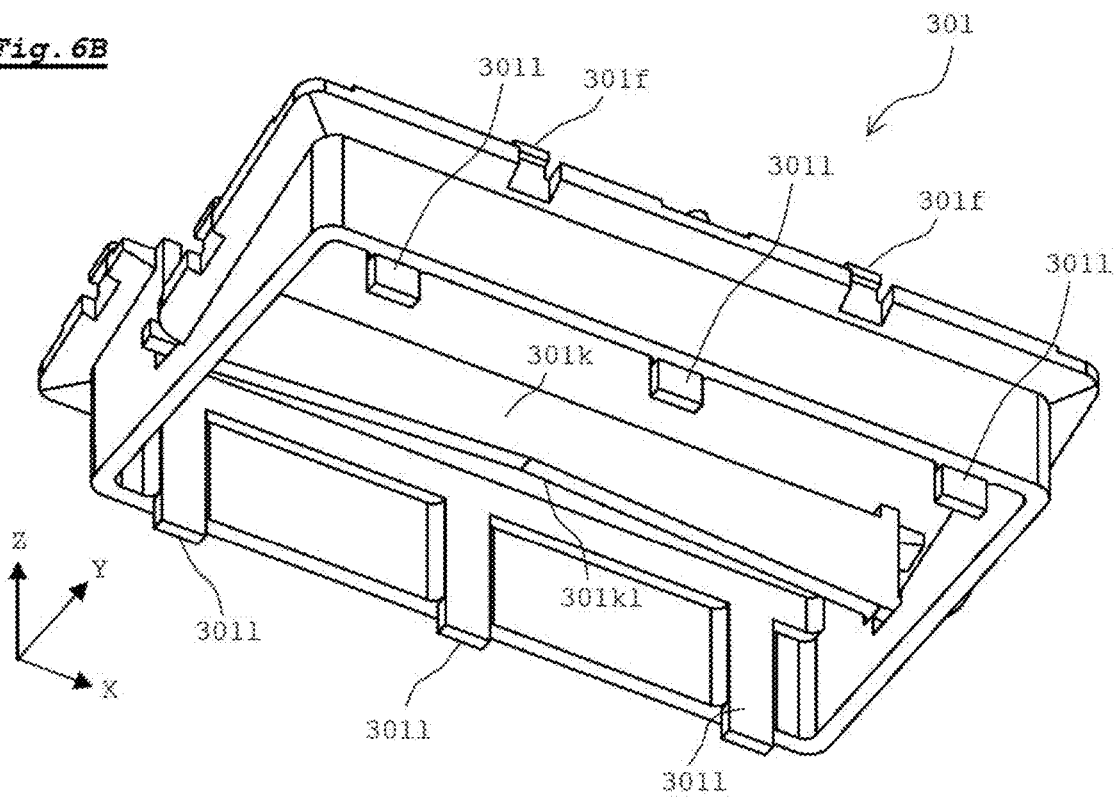

FIG. 6A and FIG. 6B are each a perspective view showing a configuration of the holder 301. FIG. 6A is a perspective view of the holder 301 as viewed from the upper side, and FIG. 6B is a perspective view of the holder 301 as viewed from the lower side.

The holder 301 is composed of a frame-like member. The holder 301 is formed from a material that has high rigidity and is lightweight. The holder 301 is configured such that surface reflection is inhibited. The surface of the holder 301 is coated in black such that the light absorption rate thereof is increased. In the present embodiment, the holder 301 is integrally formed from a magnesium alloy, and the surface of the holder 301 is subjected to black oxidation treatment. The holder 301 may be formed from a material other than magnesium, such as aluminum. The holder 301 has a shape symmetrical with respect to the X-axis direction.

The holder 301 has a lower frame portion 301*a* for supporting the screen 108, and an upper frame portion 301*b* for supporting the screen 109.

The lower frame portion 301*a* has an opening 301*c* having a rectangular shape in a plan view. In addition, two walls 301*d* are provided at an edge portion on the Y-axis positive side of the upper surface of the lower frame portion 301*a* so as to project upward, and walls 301*d* are also provided at edge portions on the X-axis positive and negative sides of the upper surface of the lower frame portion 301*a*, respectively. Furthermore, a projection 301*e* is provided between these walls 301*d* and the opening 301*c* so as to project upward. The projection 301*e* is continuously formed so as to extend along the periphery of the opening 301*c*. The height of the projection 301*e* is lower than the height of each wall 301*d*. Four hook portions 301*f* are provided on the upper surface of the lower frame portion 301*a* at the positions of the walls 301*d* so as to project in the Z-axis direction. Moreover, a columnar projection portion 301*m* is formed between the two walls 301*d* on the Y-axis negative side so as to project in the Z-axis direction.

The upper frame portion 301*b* has an opening 301*g* having a rectangular shape in a plan view. In addition, two walls 301*h* are provided at an edge portion on the Y-axis negative side of the upper surface of the upper frame portion 301*b* so as to project upward, and walls 301*h* are also provided at edge portions on the X-axis positive and negative sides of the upper surface of the upper frame portion 301*b*, respectively. Furthermore, a projection 301*i* is provided between these walls 301*h* and the opening 301*g* so as to project upward. The projection 301*i* is continuously formed so as to extend along the periphery of the opening 301*g*. The height of the projection 301*i* is lower than the height of each wall 301*h*. Four hook portions 301*j* are provided on the upper surface of the upper frame portion 301*b* at the positions of the walls 301*h* so as to project in the Z-axis direction. Moreover, a columnar projection portion 301*n* is formed between the two walls 301*d* on the Y-axis positive side so as to project in the Z-axis direction.

The step between the lower frame portion 301*a* and the upper frame portion 301*b* is closed by a wall portion 301*k*. The upper surface of the wall portion 301*k* is dug down (in the Z-axis negative direction) to be further lowered. A mountain-shaped cutout 301*k*1 is formed at the lower end of the wall portion 301*k*. The cutout 301*k*1 is formed so as to extend over substantially the entire length of the wall portion 301*k*.

Moreover, as shown in FIG. 6B, six projection pieces 301*l* are provided on the lower surface of the holder 301 so as to project downward from the inner side of the lower surface of the holder 301. The contour of the lower surface of the holder 301 is the same as the contour of the inner frame portion 303*a* of the support member 303 shown in FIG. 5A. When the holder 301 is placed on the inner frame portion 303a, the six projection pieces 3011 of the holder 301 fits inside the inner frame portion 303a. Accordingly, the holder 301 is positioned by the support member 303.

The screen 108 is placed on the projection 301e of the lower frame portion 301a and supported by the holder 301. At this time, an end portion on the Y-axis negative side of the screen 108 enters into the lower side of the wall portion 301k. The projection 301e is formed so as to continuously extend along three sides of the screen 108 in a state where the screen 108 is placed on the projection 301e. In this state, the screen 108 fits inside the five walls 301d, and the outer periphery of the screen 108 and the walls 301d are substantially in contact with each other.

The screen 109 is placed on the projection 301i of the upper frame portion 301b and supported by the holder 301. At this time, an end portion on the Y-axis positive side of the screen 109 overlaps the upper side of the wall portion 301k. The projection 301i is formed so as to continuously extend along three sides of the screen 109 in a state where the screen 109 is placed on the projection 301i. In this state, the screen 109 fits inside the five walls 301h, and the outer periphery of the screen 109 and the walls 301h are substantially in contact with each other.

Thus, after the screens 108 and 109 are installed on the lower frame portion 301a and the upper frame portion 301b, respectively, the light blocking members 302a and 302b shown in FIG. 4A are installed on the lower frame portion 301a and the upper frame portion 301b, respectively. At this time, the four hook portions 301f provided to the lower frame portion 301a fit into four holes of the light blocking member 302a, and the four hook portions 301j provided to the upper frame portion 301b fit into four holes of the light blocking member 302b. In addition, the two projection portions 301m and 301n of the holder 301 fit into holes of the light blocking members 302a and 302b, respectively. Heat-resistant members (heat-resistant packings) are inserted between the screens 108 and 109 and the light blocking members 302a and 302b.

Meanwhile, in the configuration shown in FIG. 1C, external light such as sunlight may travel backwards through the optical system including the mirror 22, toward the screens 108 and 109. Thus, as a measure against heating due to condensing of external light, the holder 301, which holds the screens 108 and 109, is made of a metal material such as a magnesium alloy as described above. Furthermore, the holder 301 is subjected to black coating or treatment of surface processing such as matting in order to prevent stray light from being mixed in light for generating a virtual image.

Here, the surface processing can be performed, for example, through a step including anodic oxidation treatment. In this case, chemical treatment is performed on the surface of the holder 301 in order to enhance the affinity with a paint. A chemical agent containing an alkaline component is used for the chemical treatment. After the chemical treatment, the holder 301 is degreased and washed, and further neutralized to remove the residual alkaline component. Thereafter, the holder 301 is coated with a black paint.

However, after the image display device 20 was left under an environment having a high temperature (85° C.) and a high humidity (85%), when the light blocking members 302a and 302b were removed from the holder 301, and significant deterioration was confirmed in the screens 108 and 109. Specifically, at the peripheral portion of the screen 108 placed on the holder 301, the substrate 108a of the screen 108 was melted and the lens layers 108b and 108c were peeled from the substrate 108a. The lower surface of the screen 108 clung to the projection 301e of the holder 301. Similar deterioration occurred in the screen 109.

Figure 7A:
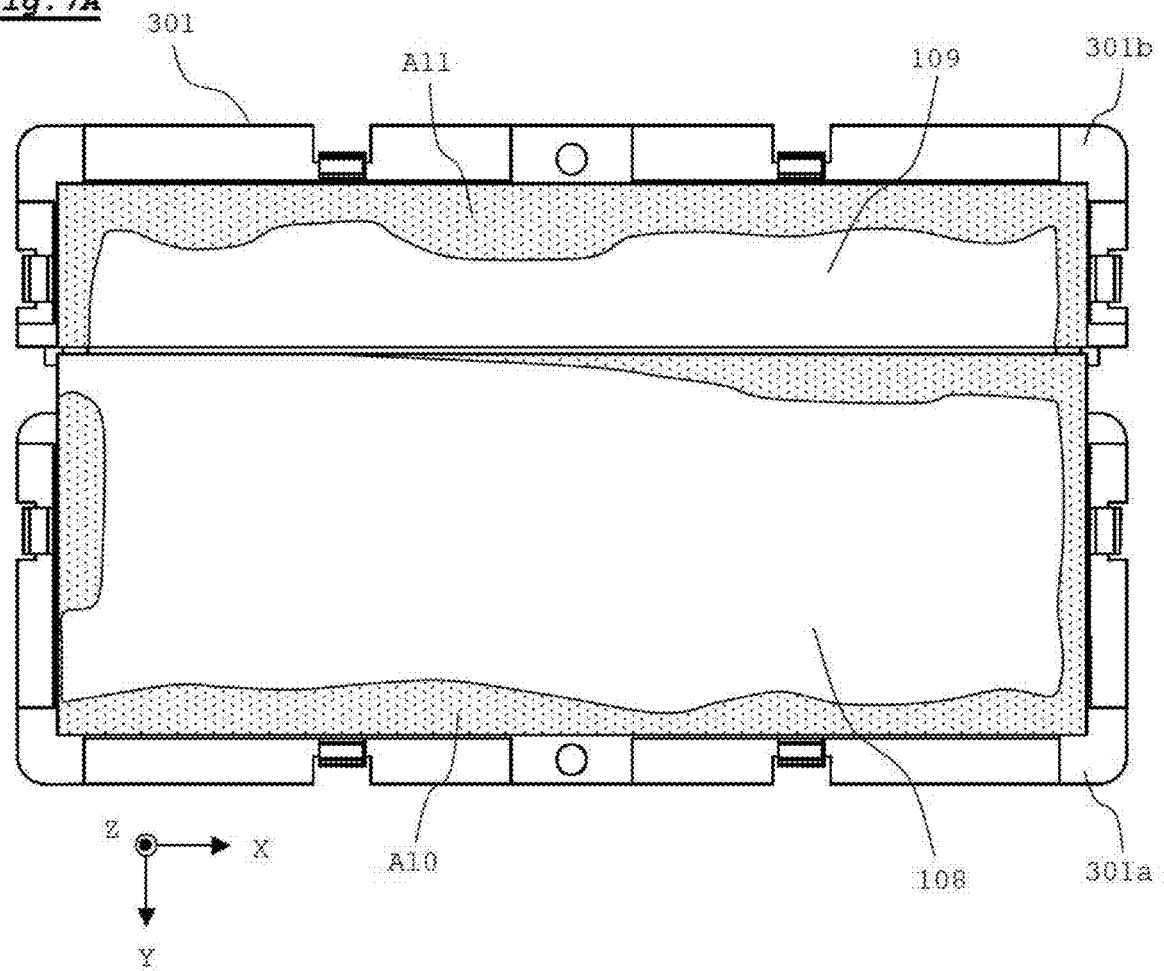
FIG. 7A is a diagram schematically showing a deterioration state of the screens in the case where the screens were installed on a holder according to a comparative example.

FIG. 7A is a diagram schematically showing deterioration states of the screens 108 and 109. In verification of FIG. 7A and FIG. 7B, a holder 301 in which the cutout 301k1 shown in FIG. 6A and FIG. 6B is not formed was used. That is, the entirety of the lower end of the wall portion 301k was parallel to the XY plane and overlapped the end portion on the Y-axis negative side of the screen 108 installed on the lower frame portion 301a. Here, the substrates of the screens 108 and 109 were made of polycarbonate.

In FIG. 7A, hatched regions A10 and A11 indicate regions where deterioration occurred in the screens 108 and 109. As shown in FIG. 7A, in the screen 109 installed on the upper frame portion 301b, deterioration occurred at an end portion on the Y-axis negative side and end portions on the X-axis positive and negative sides which were in contact with the holder 301. In the screen 108 installed on the lower frame portion 301a, deterioration occurred not only at an end portion on the Y-axis positive side and end portions on the X-axis positive and negative sides which were in contact with the holder 301, but also at the end portion on the Y-axis negative side.

Therefore, the inventors conducted an intensive study for the cause of the deterioration of the screens 108 and 109. Then, the inventors confirmed by verification a possibility that the cause is an alkaline component remaining on the surface of the holder 301 in the above chemical treatment.

Figure 7B:
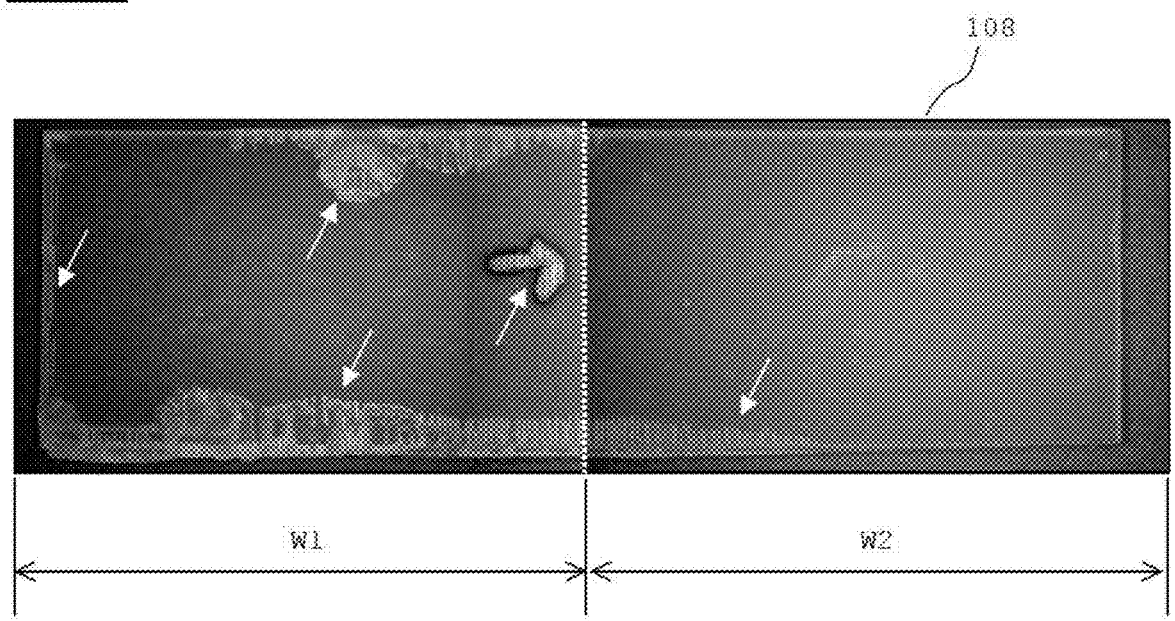
FIG. 7B is a picture showing a verification result of the cause of deterioration of the screens.

FIG. 7B is a picture showing a result of verification of the deterioration cause of the screen 108 performed by the inventors.

The inventors dipped half (range W1) of the screen 108 in a chemical agent containing an alkaline component and then left the screen 108 under the same high temperature and high humidity environment as the above for a predetermined period. The chemical agent used for the verification was a 2.38% aqueous solution of TMAH (tetramethylammonium hydroxide). Thereafter, the screen 108 was taken out from the above environment, and the deterioration condition of the screen 108 was confirmed. Accordingly, the verification result of FIG. 7B was obtained.

As shown in FIG. 7B, in the range W1 dipped in the chemical agent, the same deterioration as in FIG. 7A occurred in the screen 108. White arrows in FIG. 7B indicate deterioration locations. Moreover, also in a range W2 which was not dipped in the chemical agent, deterioration occurred in a portion of the screen 108 into which the chemical agent flowed from the range W1.

Through this verification, the inventors confirmed that the cause of the deterioration in the screens 108 and 109 shown in FIG. 7A was the alkaline component remaining in the holder 301. That is, the inventors judged that the substrates of the screens 108 and 109 were dissolved due to a reduction reaction (hydrolysis) by the alkaline component. As a result, the inventors concluded that the deterioration shown in FIG. 7A does not occur in the screen 108, by providing a configuration for preventing alkaline residue caused by the chemical treatment from permeating into the screens 108 and 109 to the holder 301 in at least regions with which the screens 108 and 109 can be in contact.

Therefore, in the present embodiment, the configuration for preventing the alkaline residue caused by the chemical treatment from permeating into the screens 108 and 109 is provided to the holder 301 in at least regions with which the screens 108 and 109 can be in contact. Hereinafter, this configuration will be described.

Figure 8A:
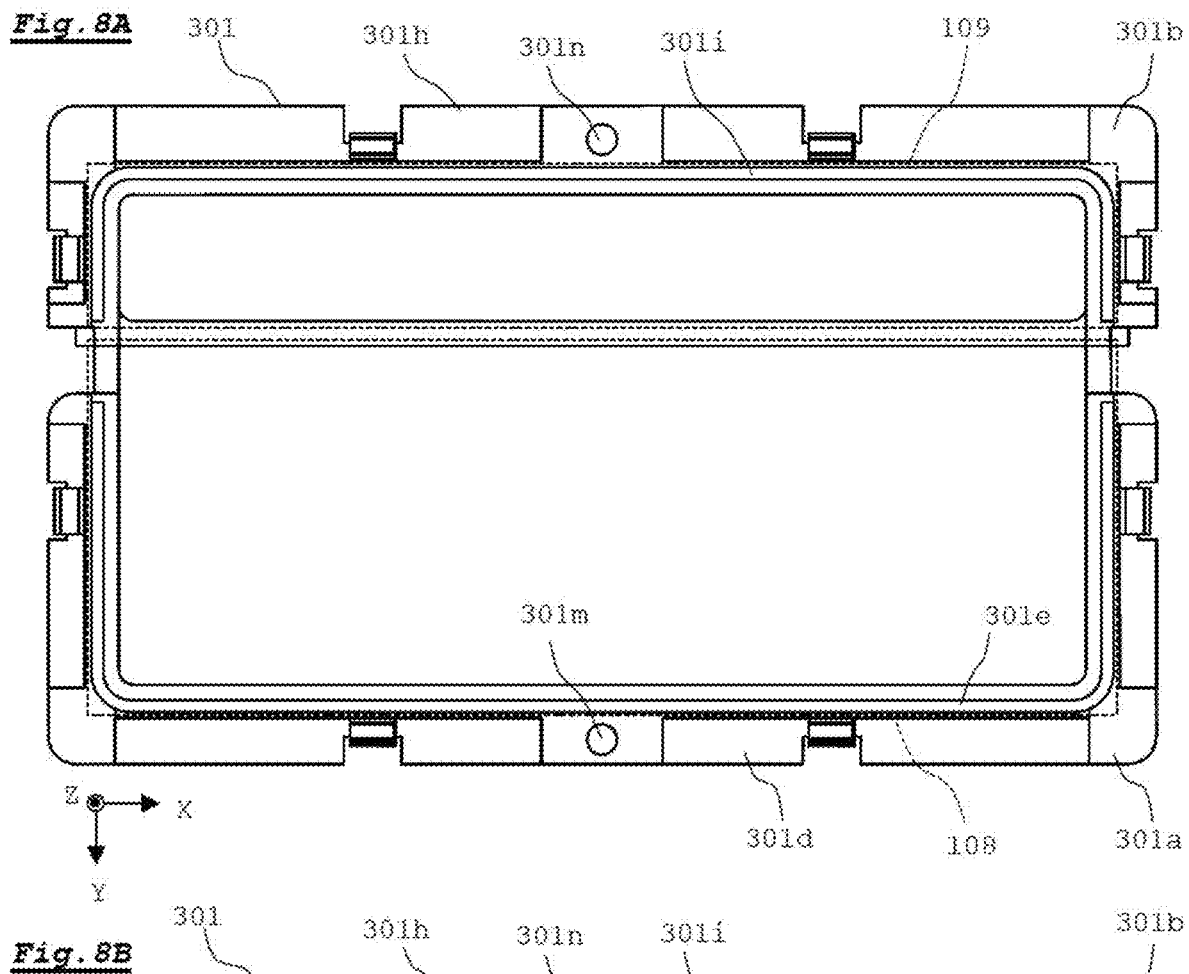
FIG. 8A is a plan view of the holder according to the embodiment.
Figure 8B:
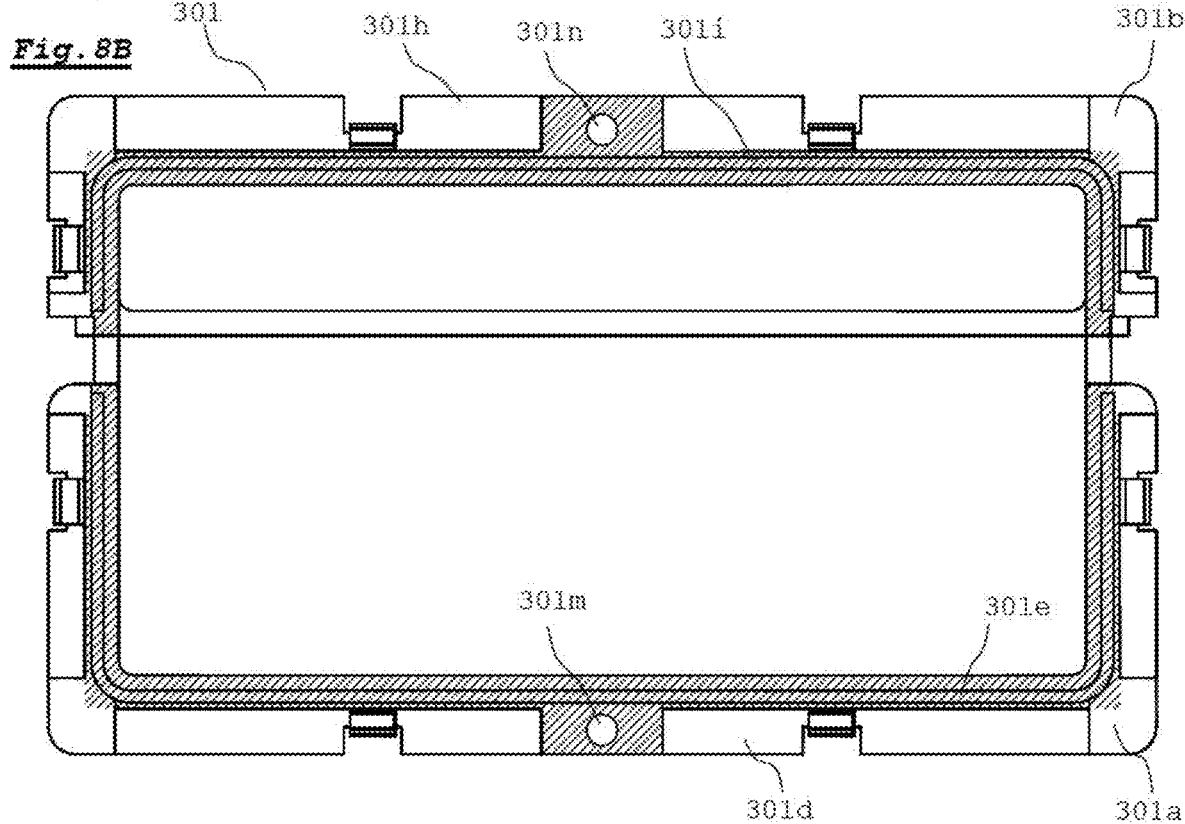
FIG. 8B is a diagram showing a region, according to the embodiment, where the presence of alkaline residue caused by chemical treatment is eliminated.
Figure 9A:
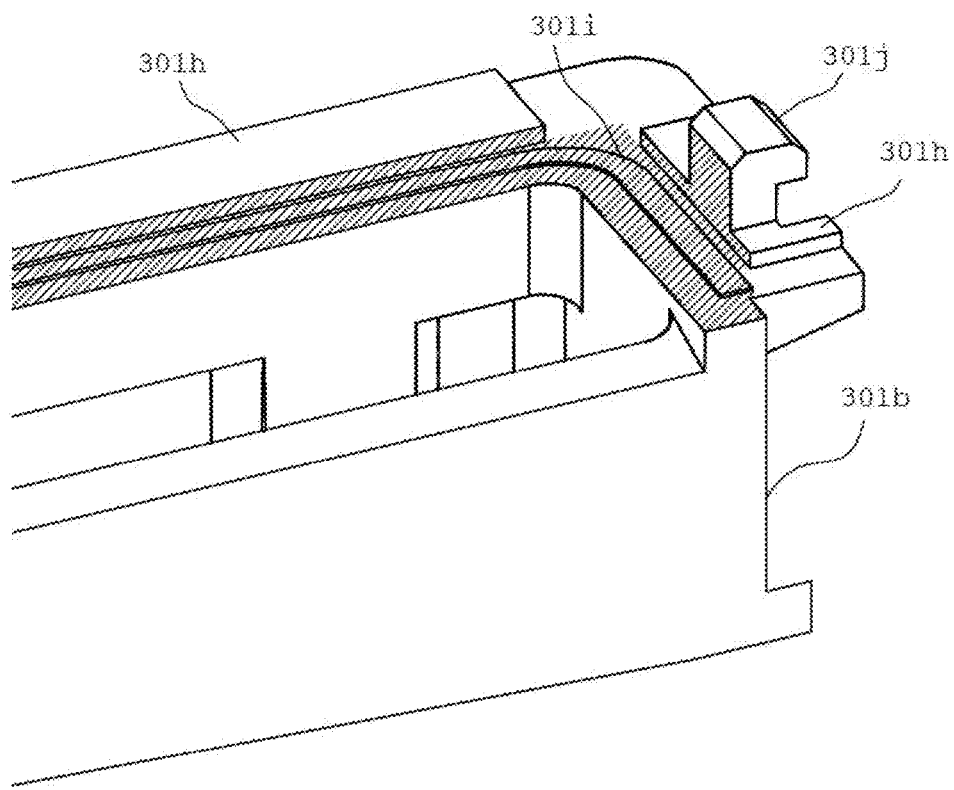
FIG. 9A and FIG. 9B are each an enlarged view showing the region, according to the embodiment, where the presence of the alkaline residue caused by the chemical treatment is eliminated.
Figure 9B:
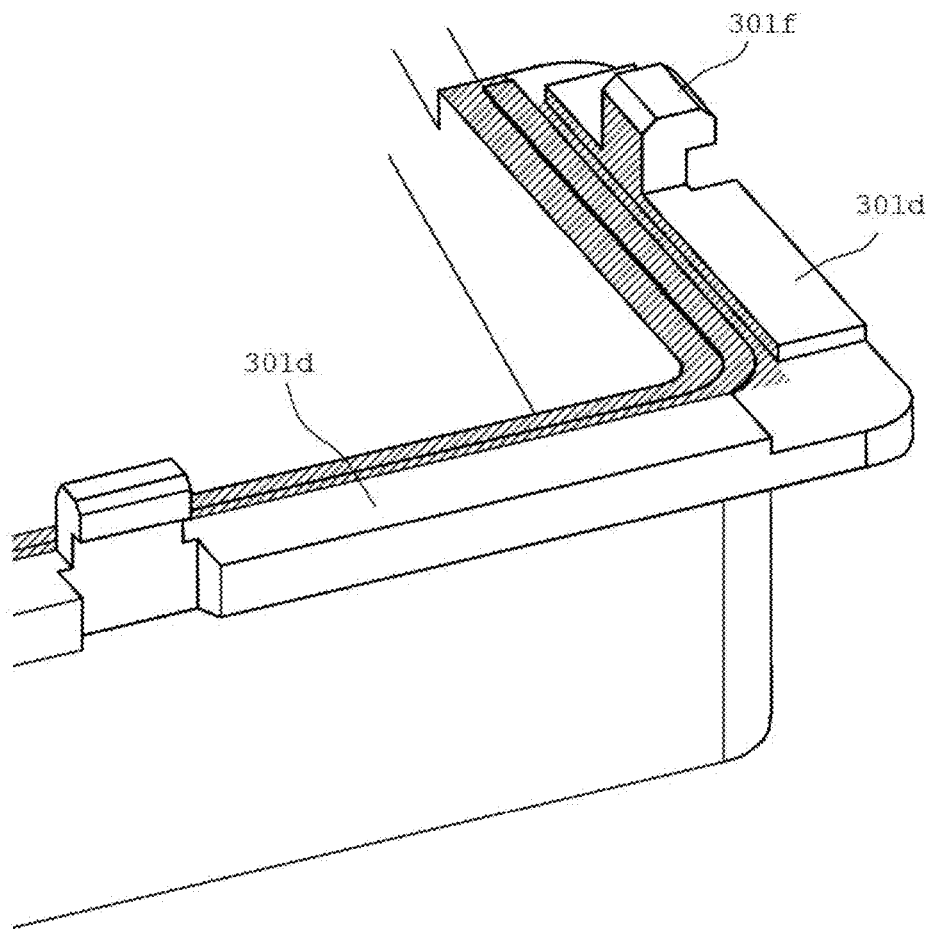

FIG. 8A is a plan view of the holder 301, and FIG. 8B is a diagram showing a region where the presence of the alkaline residue caused by the chemical treatment is eliminated. In addition, FIG. 9A and FIG. 9B are each an enlarged view showing the region where the presence of the alkaline residue caused by the chemical treatment is eliminated. In FIG. 8B, FIG. 9A, and FIG. 9B, hatched regions are the region where the presence of the alkaline residue caused by the chemical treatment is eliminated.

As shown in FIG. 8A, the screens 108 and 109 are placed on the upper surfaces of the projections 301e and 301i so as to be fitted inside the walls 301d and 301h. Therefore, the screens 108 and 109 are brought into contact with at least the upper surfaces of the projections 301e and 301i and any of the inner surfaces of the walls 301d and 301h. In addition, in the case where the projections 301e and 301i are low, the gaps between the lower surfaces of the screens 108 and 109 and the upper surfaces of the lower frame portion 301a and the upper frame portion 301b are narrow. Thus, when the screens 108 and 109 are pressed downward by installing the light blocking members 302a and 302b, there is a possibility that the lower surfaces of the screens 108 and 109 will be brought into contact with the upper surfaces of the lower frame portion 301a and the upper frame portion 301b.

Moreover, also when the lower surfaces of the screens 108 and 109 are not directly in contact with the upper surfaces of the lower frame portion 301a and the upper frame portion 301b, the lower surfaces of the screens 108 and 109 may be indirectly in contact with the upper surfaces of the lower frame portion 301a and the upper frame portion 301b through dew or the like due to moisture. In this case, there is a possibility that the alkaline residue will move from the upper surfaces of the lower frame portion 301a and the upper frame portion 301b to the screens 108 and 109 through the dew or the like.

Therefore, in the present embodiment, as shown in FIG. 8B, of the upper surfaces of the lower frame portion 301a and the upper frame portion 301b, at least the regions where the screens 108 and 109 overlap are included in the region where the presence of the alkaline residue caused by the chemical treatment is eliminated. In addition, as shown in FIG. 9A and FIG. 9B, the entire ranges of the inner surfaces of the walls 301d and 301h and the entire ranges of the inner surfaces of the hook portions 301f and 301j are set as the region where the presence of the alkaline residue caused by the chemical treatment is eliminated. Similarly, the entire ranges of the inner surfaces of the walls 301d and 301h and the hook portions 301f and 301j other than the portions shown in FIG. 9A and FIG. 9B are also set as the region where the presence of the alkaline residue caused by the chemical treatment is eliminated.

Here, the configuration for eliminating the presence of the alkaline residue caused by the chemical treatment can be applied, for example, as follows.

(1) After the chemical treatment is completed, a target region of the surface of the holder 301 is dug down by about 100 to 200 μm by cutting to remove the constituent material and expose the metal portion inside the holder 301 in the target region.

(2) The target region of the surface of the holder 301 is coated with a resin resist, and the chemical treatment is carried out thereon. After the chemical treatment, the coated portion is removed with an organic solvent.

As described above, by eliminating the presence of the alkaline residue caused by the chemical treatment from the regions shown in FIG. 8B, FIG. 9A, and FIG. 9B, the alkaline residue remaining in the holder 301 can be prevented from permeating into the screens 108 and 109 installed on the holder 301.

Figure 10A:
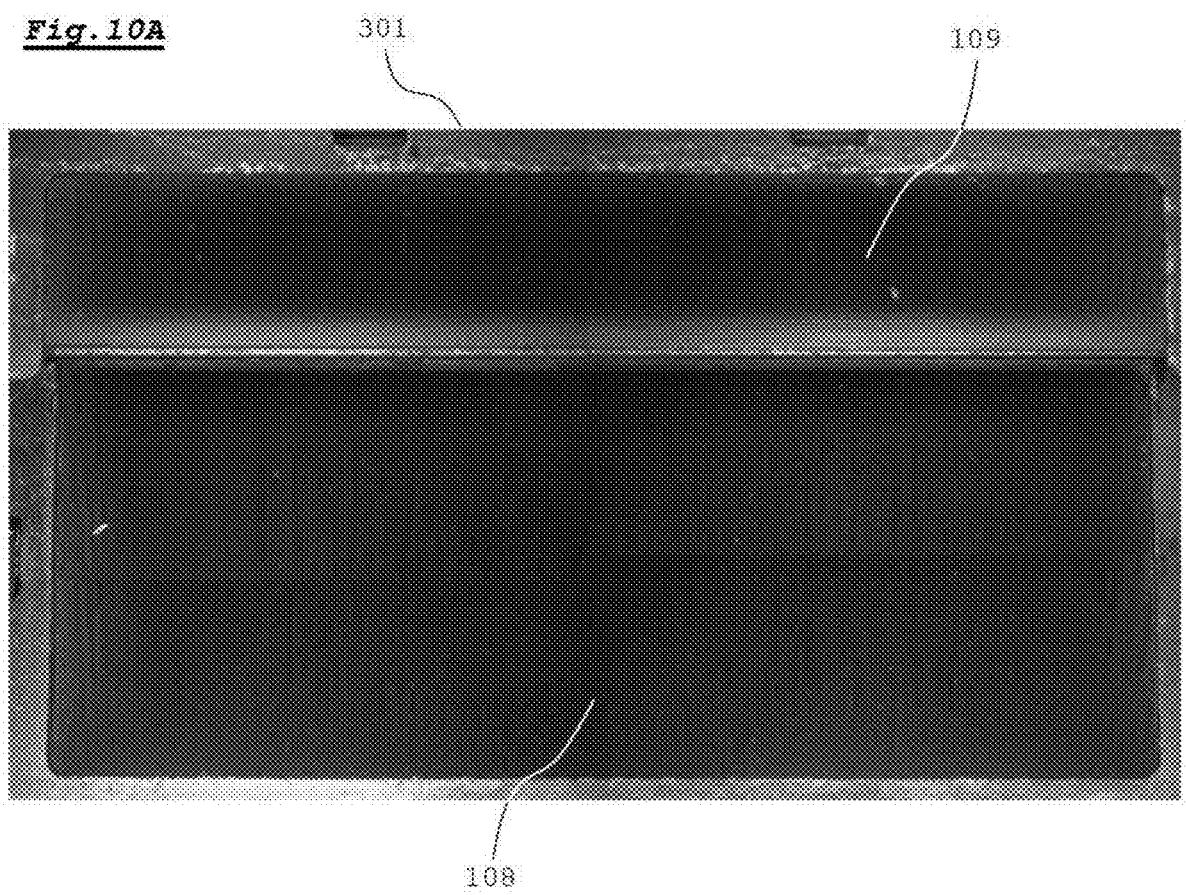
FIG. 10A is a picture showing a verification result of verifying the states of the screens, according to the embodiment, when the alkaline residue was removed.

FIG. 10A is a picture showing a verification result of verifying the states of the screens 108 and 109 when the alkaline residue was removed from the holder 301.

In this verification, neutralization treatment after the chemical treatment was enhanced more than usual to thoroughly eliminate the alkaline residue. Specifically, the treatment temperature during the neutralization treatment was raised from room temperature to about 60° C., thereby thoroughly eliminating the alkaline residue in the holder 301. Here, the neutralization treatment was performed on the entirety of the holder 301. Thereafter, the screens 108 and 109 and the light blocking members 302a and 302b were installed on the holder 301, and the holder 301 was left under the same high temperature and high humidity environment as above for a predetermined period. After the end of the leaving, the holder 301 was taken out from the above environment, and the light blocking members 302a and 302b were removed.

As shown in FIG. 10A, in this verification, deterioration was not confirmed in the screens 108 and 109. From this, the inventors reconfirmed that the cause of the deterioration of the screens 108 and 109 was the alkaline residue in the holder 301, and confirmed that the deterioration of the screens 108 and 109 can be prevented by eliminating permeation of the alkaline residue. Thus, the configuration for preventing the alkaline residue caused by the chemical treatment from permeating into the screens 108 and 109 is applied to at least the regions with which the screens 108 and 109 can be in contact, by cutting, coating with a resist, or the like, whereby deterioration of the screens 108 and 109 can be prevented.

Effects of Embodiment

Hereinafter, the following effects are achieved according to the present embodiment.

Since the configuration for preventing the alkaline residue caused by the chemical treatment from permeating into the screens 108 and 109 is applied to at least the regions with which the screens 108 and 109 (resin components) can be in contact, the alkaline residue can be prevented from permeating into the screens 108 and 109 installed on the holder 301 (resin component holding member), from the holder 301. Thus, also in the case where treatment of coating or surface processing such as matting is performed on the holder 301, deterioration of the screens 108 and 109 due to the alkaline residue can be inhibited. Therefore, good characteristics of the screens 108 and 109 can be ensured. As a result, the quality and performance of the image display device 20 can be maintained high.

Here, the configuration for preventing the alkaline residue from permeating into the screens 108 and 109 can be realized, for example, by cutting the target region of the holder 301 such that the metal material inside the holder 301 is exposed as described in the above (1). Accordingly, the alkaline residue can be reliably eliminated from the target region and can be reliably prevented from permeating into the screens 108 and 109 from the holder 301.

Figure 10B:
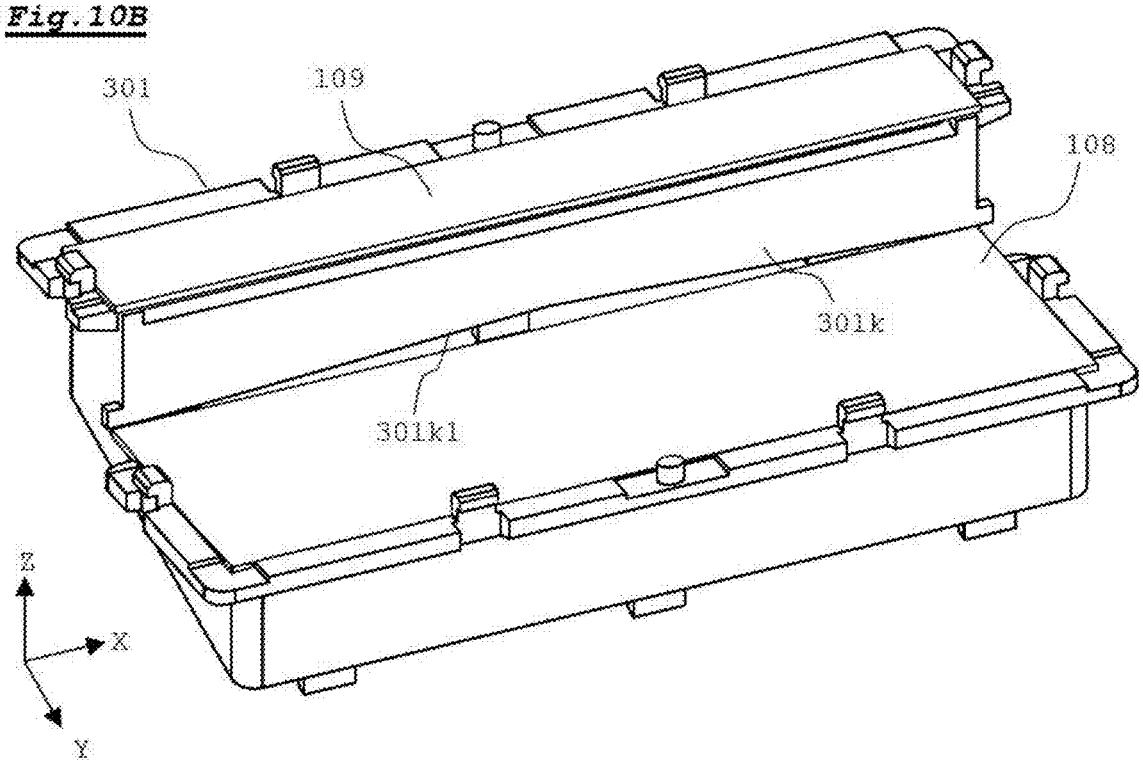
FIG. 10B is a perspective view showing the holder, according to the embodiment, in a state where the screens are installed on the holder.

In the present embodiment, the mountain-shaped cutout 301k1 is provided at the lower end of the wall portion 301k of the holder 301. Thus, in a state where the screens 108 and 109 are installed on the holder 301, a mountain-shaped gap is formed between the wall portion 301k and the end portion on the Y-axis negative side of the screen 108 as shown in FIG. 10B. Owing to this configuration, liquid dripping from the wall portion 301k onto the surface of the screen 108 is prevented from occurring. That is, when droplets are generated on the surface of the wall portion 301k due to moisture, the droplets flowing down on the surface of the wall portion 301k reach the cutout 301k1, then flow around to the lower surface of the cutout 301k1, and move along the lower surface of the cutout 301k1 to the lowest end portion of the cutout 301k1. Thereafter, the droplets move from the end portion of the cutout 301k1 to the inner surface of the holder 301 and flow downward.

Owing to this configuration, droplets containing the alkaline residue can be prevented from moving to the end portion on the Y-axis negative side of the screen 108 and deteriorating the end portion. That is, although deterioration occurred at the end portion on the Y-axis negative side of the screen 108 as shown in FIG. 7A, it is considered that this deterioration occurred since droplets containing the alkaline residue flowed down from the surface of the wall portion 301k to the screen 108. Thus, by providing the cutout 301k1 (structure for inhibiting liquid dripping from the wall portion 301k to the screen 108) to the lower end of the wall portion 301k to prevent droplets flowing down on the surface of the wall portion 301k from moving to the screen 108 as described above, deterioration of the screen 108 at the end portion on the Y-axis negative side can be prevented.

<Modification 1>

In the above embodiment, the configuration for preventing the alkaline residue caused by the chemical treatment from permeating into the screens 108 and 109, which are resin members, is exemplified by application of cutting and coating with a resist and enhancement of neutralization treatment. However, the configuration for preventing the alkaline residue from permeating into the screens 108 and 109 is not limited thereto.

For example, the alkaline residue may be prevented from permeating into the screens 108 and 109, by providing spacers for separating the screens 108 and 109 from the surface subjected to the chemical treatment, in at least the regions with which the screens 108 and 109 can be in contact.

FIG. 11A and FIG. 11B are diagrams showing a configuration of a modification in this case. FIG. 11A is a plan view of a holder 301 according to Modification 1. FIG. 11B is a plan view of the holder 301, according to Modification 1, in a state where spacers 331 and 332 are installed on the holder 301.

As shown in FIG. 11A, in Modification 1, the projections 301e and 301i are omitted from the upper surfaces of the lower frame portion 301a and the upper frame portion 301b, respectively. As shown in FIG. 11B, as the configuration for preventing the alkaline residue from permeating into the screens 108 and 109, the spacer 331 is provided on the upper surface of the lower frame portion 301a, and the spacer 332 is provided on the upper surface of the upper frame portion 301b. The spacer 331 extends along the outer periphery of the opening 301c so as to fit inside the four walls 301d of the lower frame portion 301a. In addition, the spacer 332 extends along the outer periphery of the opening 301g so as to fit inside the four walls 301h of the upper frame portion 301b.

The thickness of the spacer 331 is smaller than the height of each wall 301d. In addition, the thickness of the spacer 332 is smaller than the height of each wall 301h. The spacers 331 and 332 are each made of, for example, a material having resistance to the alkaline residue, such as fluorine rubber, Teflon (registered trademark) resin, or polyamide.

According to Modification 1, since the spacers 331 and 332 are interposed between the upper surfaces of the lower frame portion 301a and the upper frame portion 301b and the screens 108 and 109, the alkaline residue can be prevented from permeating into the screens 108 and 109 from the upper surfaces of the lower frame portion 301a and the upper frame portion 301b. In addition, according to the configuration of Modification 1, a step of cutting, coating with a resist, or the like can be omitted, and thus the holder 301 can be easily formed.

Also, in Modification 1, similar to the above embodiment, the configuration for preventing the alkaline residue from permeating into the screens 108 and 109 is preferably applied to the inner surfaces of the walls 301d and 301h by cutting, coating with a resist, or the like. In addition, similar to the above embodiment, the configuration for preventing the alkaline residue from permeating into the screens 108 and 109 is preferably also applied to regions other than the regions where the spacers 331 and 332 are provided, of the regions of the upper surfaces of the lower frame portion 301a and the upper frame portion 301b where the screens 108 and 109 overlap, by cutting, coating with a resist, or the like. Accordingly, the alkaline residue can be more reliably prevented from permeating into the screens 108 and 109.

<Modification 2>

Figure 12:
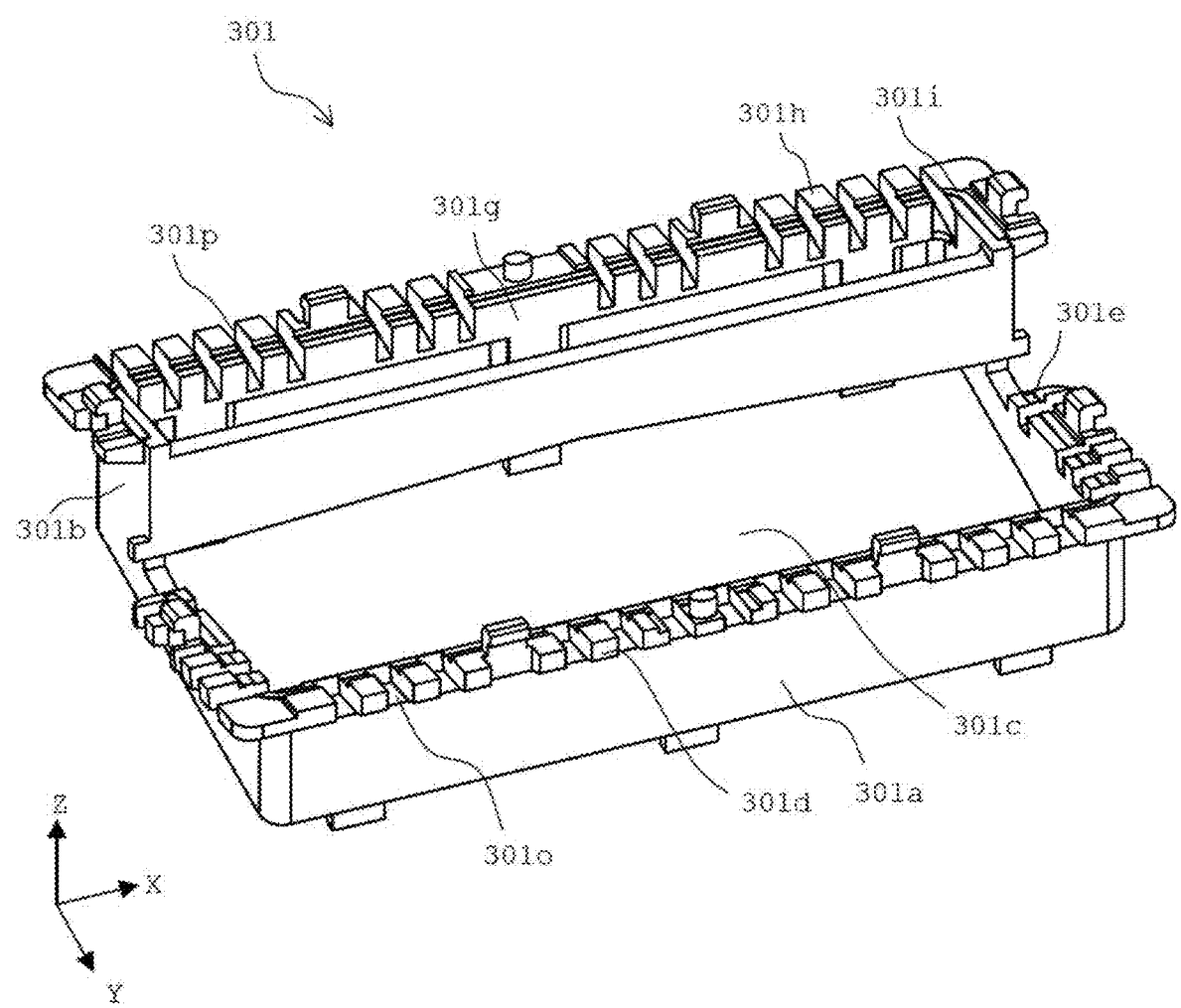
FIG. 12 is a perspective view showing a configuration of a holder according to Modification 2.

FIG. 12 is a perspective view showing a configuration of the holder 301 according to Modification 2.

In Modification 2, unlike Modification 1, a plurality of grooves 301o or 301p are formed on each of the upper surface of the lower frame portion 301a and the upper surface of the upper frame portion 301b. The depths of the grooves 301o and 301p are larger than the heights of the walls 301d and 301h, respectively. In addition, the projections 301e and 301i are divided by the grooves 301o and 301p. Furthermore, also in Modification 2, the configuration for preventing the alkaline residue caused by the chemical treatment from permeating into the resin members is applied to regions, other than the grooves 301o and 301p, of the hatched regions in FIG. 8B, FIG. 9A, and FIG. 9B. The other configuration is the same as in the above embodiment.

According to the configuration of Modification 2, in a state where the screens 108 and 109 are installed, communication portions that provide communication between the inside of the holder 301 and the outside through the vicinities of portions where the screens 108 and 109 are installed, are formed by the grooves 301o and 301p. Accordingly, even when the holder 301 is placed under a high temperature and high humidity environment, the moisture inside the holder 301 does not stay at the portions where the screens 108 and 109 are installed, and is released to the outside through the grooves 301o and 301p. Thus, the portions where the screens 108 and 109 are installed can be prevented from getting wet with moisture, and the alkaline residue can be prevented from permeating into the screens 108 and 109 through water droplets generated by moisture. As a result, the alkaline residue can be more reliably prevented from permeating into the screens 108 and 109.

The numbers and the shapes of the grooves 301o and 301p are not limited to those shown in FIG. 12, and can be changed as appropriate. The communication portions that provide communication between the inside of the holder 301 and the outside through the vicinities of the portions where the screens 108 and 109 are installed do not necessarily have to be formed by the grooves 301o and 301p, and horizontal holes may be provided in the vicinities of the portions where the screens 108 and 109 are installed, so as to penetrate the lower frame portion 301a and the upper frame portion 301b.

<Modification 3>

FIG. 13A is a cross-sectional view schematically showing a state of peeling that may occur in the screen 108.

In FIG. 13A, reference characters 108b1 and 108c1 denote lens portions having an arc cross-sectional shape and formed in the lens layers 108b and 108c of the screen 108, respectively. In general, the screen 108 is obtained by cutting out a region having a predetermined size from a mother substrate having the lens portions 108b1 and 108c1 formed thereon. In this case, as shown in FIG. 13A, the lens portion 108c1 near the edge of the screen 108 may be peeled from the substrate 108a due to stress at the time of cutting-out. In such a case, the alkaline residue easily permeates into the substrate 108a from the peeled portion. As a result, the substrate 108a made of a resin is easily deteriorated due to the alkaline residue. The same applies to the screen 109.

Therefore, in Modification 3, as shown in FIG. 13B, flat portions 108b2 and 108c2 having a predetermined thickness are provided near the edge of the screen 108 instead of the lens portions 108b1 and 108c1. That is, at the time of forming the screen 108, an ultraviolet curable resin that is the same as that of the lens portions 108b1 and 108c1 is uniformly applied to regions near the edge with a predetermined thickness. By providing the flat portions 108b2 and 108c2 near the edge as described above, the adhesion strength between the lens layers 108b and 108c (flat portions 108b2 and 108c2) and the substrate 108a is ensured near the edge. Therefore, peeling due to stress at the time of cutting-out is less likely to occur near the edge. Accordingly, the alkaline residue is inhibited from permeating into the substrate 108a from a peeled portion, and deterioration of the substrate 108a due to the alkaline residue can be effectively inhibited. This configuration and effect are also the same as in the screen 109.

FIG. 13C is a plan view schematically showing regions where flat portions are formed in the screens 108 and 109 according to Modification 3.

In FIG. 13C, hatched regions A21 and A22 indicate regions where the above-described flat portions are provided. Each flat portion may be provided in at least a region including sides held by the holder 301, of the four sides of the rectangular screen 108 or 109. In the above embodiment, the side on the Y-axis negative side of the screen 108 is not held by the holder 301 and is separated from the holder 301. In addition, the side on the Y-axis positive side of the screen 109 is not held by the holder 301 and is separated from the holder 301. Therefore, the alkaline residue is less likely to permeate into these sides of the screens 108 and 109 from the holder 301. Thus, it can be said that even if a flat portion is not provided at these sides to inhibit peeling, deterioration due to permeation of the alkaline residue is less likely to occur at these sides.

It should be noted that in the case where the screens 108 and 109 can be more smoothly cut out from a mother substrate when a flat portion is also provided at these sides, a flat portion may also be provided at these sides.

The width of each flat portion is set at least such that scanning regions with laser light on the screens 108 and 109, that is, regions where an image is drawn on the screens 108 and 109, are not included. That is, the width of each flat portion is set such that the lens portions 108b1 and 108c1 are always present in the scanning regions with laser light.

It should be noted that the screens 108 and 109 according to Modification 3 can be used even in the case where the configuration for preventing permeation of the alkaline residue is not applied to the regions of the holder 301 with which the screens 108 and 109 can be in contact. That is, when the screens 108 and 109 according to Modification 3 are installed on the holder 301 having such a configuration, peeling near the edges of the screens 108 and 109 is inhibited as describe above. Thus, near the edges, the alkaline residue is less likely to permeate into the substrates of the screens 108 and 109 from the holder 301. Therefore, even in this case, by including the above configuration of Modification 3, deterioration of the screens 108 and 109 can be effectively prevented.

<Modification 4>

Figure 14A:
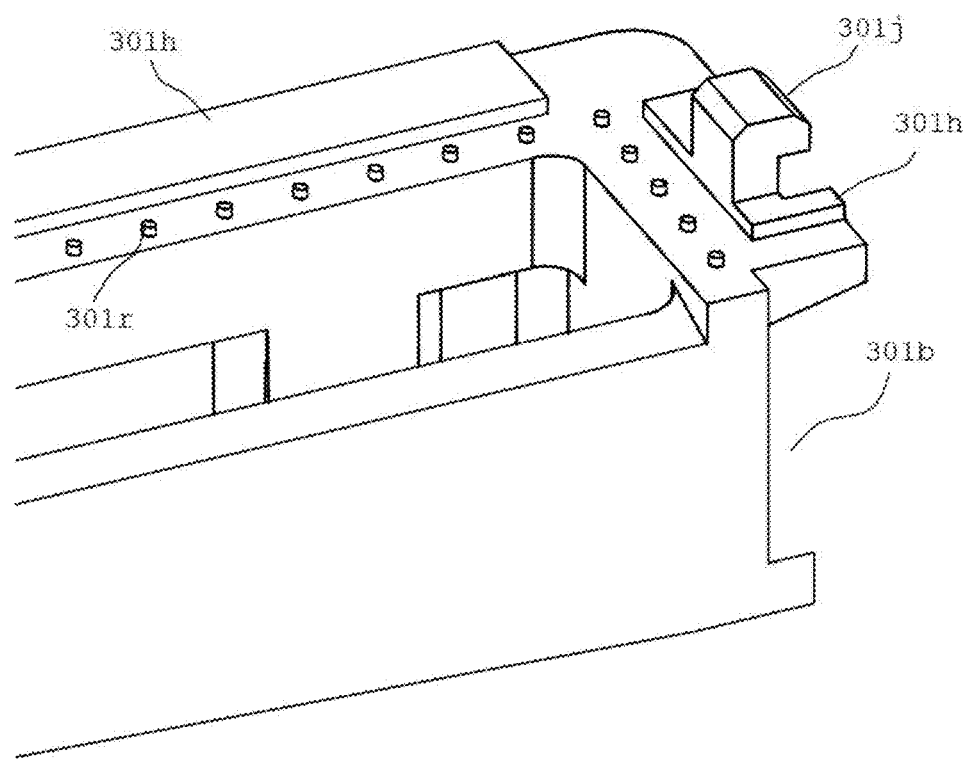
FIG. 14A and FIG. 14B are each a partially enlarged view of a holder according to Modification 4.
Figure 14B:
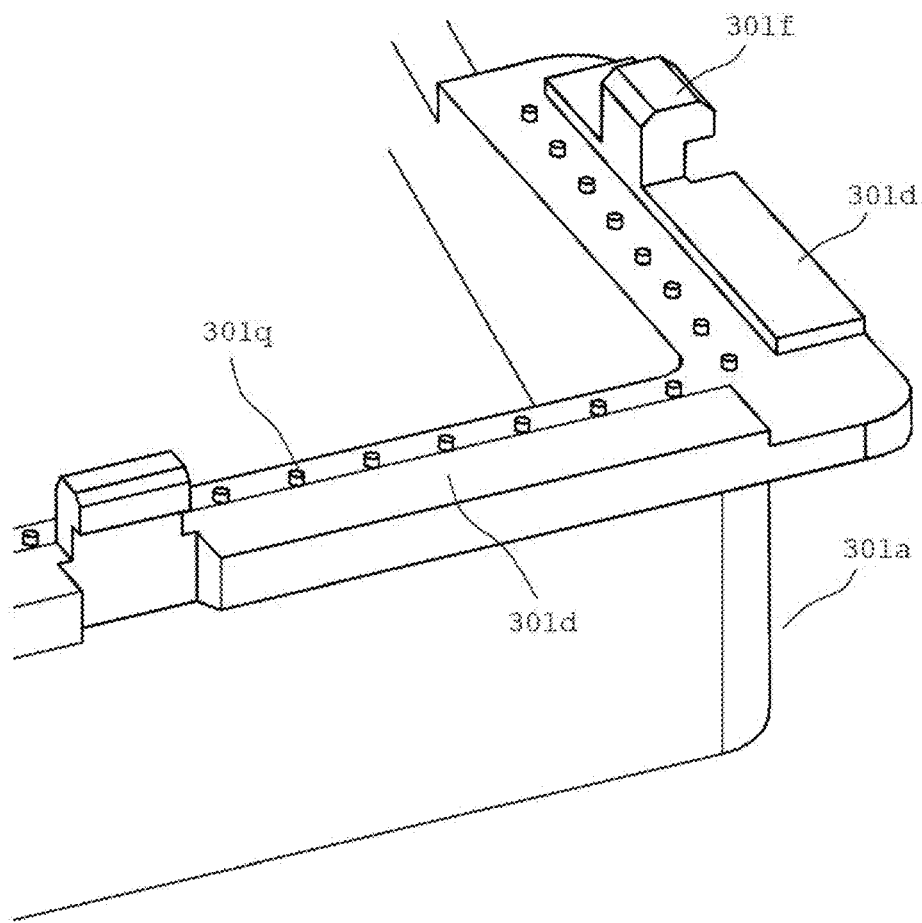

FIG. 14A and FIG. 14B are each a perspective view showing a configuration of a holder 301 according to Modification 4. FIG. 14A and FIG. 14B each show a partially enlarged view of the holder 301.

As shown in FIG. 14A and FIG. 14B, in Modification 4, the projections 301e and 301i shown in FIG. 9 are omitted from the upper surfaces of the lower frame portion 301a and the upper frame portion 301b. As the configuration for preventing the alkaline residue from permeating into the screens 108 and 109, a plurality of projection portions 301q are formed on the upper surface of the lower frame portion 301a, and a plurality of projection portions 301r are formed on the upper surface of the upper frame portion 301b. The projection portions 301q are formed along the outer periphery of the opening 301c so as to fit inside the four walls 301d of the lower frame portion 301a. In addition, the projection portions 301r are formed along the outer periphery of the opening 301g so as to fit inside the four walls 301h of the upper frame portion 301b. Here, the projection portions 301q and 301r are formed so as to be arranged at substantially equal intervals.

The plurality of projection portions 301q formed on the upper surface of the lower frame portion 301a each have a columnar shape. The projection portions 301q may each have another shape such as a prism, a cone, and a pyramid. The heights of the projection portions 301q are constant. The heights of the projection portions 301q are lower than the height of each wall 301d. The sizes of the projection portions 301q are not particularly limited as long as the screen 108 can be supported on the upper surface of the lower frame portion 301a.

The plurality of projection portions 301r formed on the upper surface of the upper frame portion 301b each have a columnar shape. The projection portions 301r may each have another shape such as a prism, a cone, and a pyramid. The heights of the projection portions 301r are constant. The heights of the projection portions 301r are lower than the height of each wall 301h. The sizes of the projection portions 301r are not particularly limited as long as the screen 109 can be supported on the upper surface of the upper frame portion 301b. The heights of the projection portions 301q and the heights of the projection portions 301r may be different from each other.

The alkaline residue is removed from the projection portions 301q and 301r by the above-described cutting or coating with a resist. Accordingly, even in a state where the alkaline residue is not removed from the upper surfaces of the lower frame portion 301a and the upper frame portion 301b, since the projection portions 301q and 301r from which the alkaline residue is removed are present between the screens 108 and 109 and the upper surfaces of the lower frame portion 301a and the upper frame portion 301b, the alkaline residue can be prevented from permeating into the screens 108 and 109. In addition, according to Modification 4, a step of cutting, coating with a resist, or the like is performed only on the projection portions 301q and 301r, and thus the holder 301 can be easily formed.

Of the projection portions 301*q* and 301*r*, portions with which the screens 108 and 109 are directly in contact are the upper surfaces of the projection portions 301*q* and 301*r*. Thus, cutting or coating with a resist may be performed only on the upper surfaces of the projection portions 301*q* and 301*r*, and the alkaline residue may be removed therefrom. In this case, the holder 301 can be more easily formed.

In the case where the projection portions 301*q* and 301*r* each have a cone, pyramid, or hemispherical shape, contact between the projection portions 301*q* and 301*r* and the screens 108 and 109 is almost point contact, and the contact area of each contact is extremely small. In this case, even when treatment for removing the alkaline residue is not performed on the projection portions 301*q* and 301*r*, since the contact area is extremely small, it can also be assumed that almost no alkaline residue permeates into the screens 108 and 109 from the projection portions 301*q* and 301*r*. Therefore, in the case where the projection portions 301*q* and 301*r* each have such a shape, treatment for removing the alkaline residue from the projection portions 301*q* and 301*r* may be omitted. However, in order to more reliably prevent permeation of the alkaline residue, treatment for removing the alkaline residue is preferably performed on the projection portions 301*q* and 301*r* even in the case where the projection portions 301*q* and 301*r* each have such a shape.

Also in Modification 4, similar to the above embodiment, the configuration for preventing the alkaline residue from permeating into the screens 108 and 109 is preferably applied to the inner surfaces of the walls 301*d* and 301*h* by cutting, coating with a resist, or the like. In addition, similar to the above embodiment, the configuration for preventing the alkaline residue from permeating into the screens 108 and 109 may be applied also to regions other than the regions where the projection portions 301*q* and 301*r* are provided, of the regions of the upper surfaces of the lower frame portion 301*a* and the upper frame portion 301*b* where the screens 108 and 109 overlap, by cutting, coating with a resist, or the like. Accordingly, the alkaline residue can be more reliably prevented from permeating into the screens 108 and 109.

<Other Modifications>

The same configuration for eliminating permeation of the alkaline residue does not necessarily have to be applied to the entireties of the regions with which the screens 108 and 109 can be in contact. For example, a configuration for eliminating permeation of the alkaline residue may be applied to parts of the regions with which the screens 108 and 109 can be in contact, by cutting, and a configuration for eliminating permeation of the alkaline residue may be applied to other parts of the regions by coating with a resist. In addition, as in the modification shown in FIG. 11B, the spacers 331 and 332 may be disposed in parts of the regions with which the screens 108 and 109 can be in contact, and a configuration for eliminating permeation of the alkaline residue may be applied to other parts of the regions by cutting or coating with a resist.

The region in which the configuration for preventing permeation of the alkaline residue is not necessarily limited to the hatched regions in FIG. 8B, FIG. 9A, and FIG. 9B, and may include at least the regions with which the screens 108 and 109 can be in contact. For example, of the regions shown in FIG. 8B, the regions around the projection portion 301*m* and 301*n* may be excluded from the region to which the configuration for preventing permeation of the alkaline residue is applied, or the corner portions, between the walls 301*d* and 301*h*, of the upper surfaces of the lower frame portion 301*a* and the upper frame portion 301*b* may be included in the region to which the configuration for preventing permeation of the alkaline residue is applied.

In the above embodiment and Modifications 1 and 2, instead of the chemical treatment, other surface treatment through which no alkaline residue can remain may be performed on the regions to which the configuration for preventing permeation of the alkaline residue is applied. For example, heat-resistant coating (powder coating by an electrostatic coating method) using an epoxy paint may be performed on the regions. Accordingly, black coating can be performed on these regions, and stray light reflected by the holder 301 can be more reliably prevented from being mixed in laser light for generating a virtual image.

The cutout 301*k*1 at the lower end of the wall portion 301*k* does not necessarily have to have a mountain shape that is tilted in both directions as shown in FIG. 10B, and may have, for example, a shape that is tilted only in one direction.

The structure for inhibiting liquid dripping from the wall portion 301*k* to the screen 108 does not necessarily have to be the cutout 301*k*1, and may be, for example, a configuration in which a mountain-shaped eave is provided at the side surface on the Y-axis positive side of the wall portion 301*k*. In this case, water droplets flowing down on the side surface of the wall portion 301*k* is received by the eave and guided to the end portion on the X-axis positive side or the X-axis negative side.

The shape of the holder 301 is not necessarily limited to the shapes shown in the above embodiment and Modifications 1 and 2.

In the above embodiment, the configuration for preventing permeation of the alkaline residue does not necessarily have to be provided to the entireties of the regions with which the screens 108 and 109 can be in contact. For example, in the screens 108 and 109, end portions that are considered to be less likely to affect the functions of the screens 108 and 109 may be in contact with the regions subjected to the chemical treatment.

In the above embodiment, the two screens 108 and 109 are installed on the holder 301, but the number of screens is not limited thereto, and only one screen may be installed on the holder 301.

The screens do not necessarily have to move in the Z-axis direction, and may be fixed at predetermined positions. In this case, only an image having no parallax in the depth direction is displayed.

The screens 108 and 109 do not necessarily have to have lens layers formed on both surfaces thereof. For example, a plurality of lens portions that diffuse laser light in the X-axis direction and the Y-axis direction may be formed on one surface of each of the screens 108 and 109 so as to be arranged in a matrix. In this case, the flat portions shown in Modification 3 may be formed on the surfaces of the screens 108 and 109 on which these lens portions are formed.

In the above embodiment, the example in which the present invention is applied to the head-up display mounted on the passenger car 1 has been described, but the present invention can also be applied to other types of image display devices in addition to the vehicle-mounted device.

The configurations of the image display device 20 and the irradiation light generation unit 21 are not limited to the configurations shown in FIG. 1C and FIG. 2, and can be changed as appropriate.

The resin component holding member according to the present invention can be used in various devices in addition to the above-described image display device 20. For example, the resin component holding member according to the present invention may be used in a laser radar that emits laser light to a target region and measures the presence of an object or the distance to an object in the target region on the basis of the reflected light. In this case, the resin component holding member can be used, for example, for holding a condensing lens that is for condensing the reflected light and made of a resin material.

In addition to the above, various modifications can be made to the embodiments of the present invention, without departing from the scope of the technological idea defined by the claims.

What is claimed is:

1. A resin component holding member made of a metal material and configured to hold a resin component, wherein the resin component holding member is subjected to chemical treatment, the resin component holding member comprising:
    a region with which the resin component is in contact, the region having a configuration for preventing alkaline residue caused by the chemical treatment from permeating into the resin component; and
    a plurality of grooves formed adjacent to the region, the plurality of grooves being used as passages connecting inside and outside of the resin component holding member when the resin component holding member holds the resin component.

2. The resin component holding member according to claim 1, wherein at least the region with which the resin component is in contact includes a region where a surface is cut such that the metal material is exposed.

3. The resin component holding member according to claim 1, wherein at least the region with which the resin component is in contact includes a region where surface treatment through which the alkaline residue cannot remain is performed instead of the chemical treatment.

4. The resin component holding member according to claim 1, wherein a spacer for separating the resin component from a surface subjected to the chemical treatment is provided in at least the region with which the resin component is in contact.

5. The resin component holding member according to claim 1, wherein, on at least the region with which the resin component is in contact, a plurality of projection portions for separating the resin component from a surface of the region are formed.

6. An image display device comprising:
    a resin component; and
    a resin component holding member made of a metal material and configured to hold the resin component, wherein the resin component holding member is subjected to chemical treatment,
    wherein the resin component holding member includes:
        a region with which the resin component is in contact, the region having a configuration for preventing alkaline residue caused by the chemical treatment from permeating into the resin component; and
        a plurality of grooves formed adjacent to the region, the plurality of grooves being used as passages connecting inside and outside of the resin component holding member when the resin component holding member holds the resin component.

7. The image display device according to claim 6, wherein, in the resin component holding member, at least the region with which the resin component is in contact includes a region where a surface is cut such that the metal material is exposed.

8. The image display device according to claim 6, wherein, in the resin component holding member, at least the region with which the resin component is in contact includes a region where surface treatment through which the alkaline residue cannot remain is performed instead of the chemical treatment.

9. The image display device according to claim 6, wherein the resin component holding member includes a spacer, for separating the resin component from a surface subjected to the chemical treatment, provided in at least the region with which the resin component is in contact.

10. The image display device according to claim 6, wherein, in the resin component holding member, on at least the region with which the resin component is in contact, a plurality of projection portions for separating the resin component from a surface of the region are formed.

11. The image display device according to claim 6, wherein the resin component is a light diffusion member including a substrate made of a resin material.

12. The image display device according to claim 11, wherein
    the resin component holding member holds a first light diffusion member and a second light diffusion member disposed so as to be aligned with a step having a predetermined height with respect to the first light diffusion member, and includes, at a boundary between the first light diffusion member and the second light diffusion member, a wall portion corresponding to the step, and
    a structure for inhibiting liquid dripping from the wall portion to the second light diffusion member is provided between a lower end of the wall portion and the second light diffusion member.

13. The image display device according to claim 11, wherein a flat portion having no lens portion is formed at least an end portion, of the light diffusion member, held by the resin component holding member.

14. The image display device according to claim 13, wherein the light diffusion member comprises:
    a substrate made of resin;
    a plurality of lens portions formed on at least one surface of the substrate; and
    the end portion held by the resin component holding member.

* * * * *